United States Patent
Chandrasekaran et al.

(10) Patent No.: US 11,300,656 B2
(45) Date of Patent: Apr. 12, 2022

(54) RADAR SENSOR

(71) Applicant: NANYANG TECHNOLOGICAL UNIVERSITY, Singapore (SG)

(72) Inventors: Karthik Thothathri Chandrasekaran, Singapore (SG); Arokiaswami Alphones, Singapore (SG); Muhammad Faeyz Karim, Singapore (SG); Ashita Priya Thomas, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 17/261,737

(22) PCT Filed: Jul. 24, 2019

(86) PCT No.: PCT/SG2019/050360
§ 371 (c)(1),
(2) Date: Jan. 20, 2021

(87) PCT Pub. No.: WO2020/022962
PCT Pub. Date: Jan. 30, 2020

(65) Prior Publication Data
US 2021/0278499 A1    Sep. 9, 2021

(30) Foreign Application Priority Data
Jul. 25, 2018   (SG) .......................... 10201806351Y

(51) Int. Cl.
*G01S 7/35* (2006.01)
*H01Q 13/20* (2006.01)
(Continued)

(52) U.S. Cl.
CPC ............... *G01S 7/354* (2013.01); *G01S 7/03* (2013.01); *G01S 13/38* (2013.01); *G01S 13/422* (2013.01); *H01Q 13/20* (2013.01); *G01S 7/417* (2013.01)

(58) Field of Classification Search
CPC . G01S 13/53; G01S 7/03; G01S 7/282; G01S 7/285; G01S 7/354; G01S 7/41;
(Continued)

(56) References Cited

U.S. PATENT DOCUMENTS

2011/0037675 A1* 2/2011 Chen .................... H01Q 13/20
343/848
2011/0254746 A1* 10/2011 Park .................... H01Q 13/206
343/713
(Continued)

FOREIGN PATENT DOCUMENTS

CN          108306087          7/2018

OTHER PUBLICATIONS

Barbon, Francesco, et al. "A six-port interferometer based micrometer-accuracy displacement and vibration measurement radar." *2012 IEEE/MTT-S International Microwave Symposium Digest*. IEEE, 2012.
(Continued)

*Primary Examiner* — Donald H B Braswell
(74) *Attorney, Agent, or Firm* — Pearl Cohen Zedek Latzer Baratz LLP

(57) ABSTRACT

Example embodiments describe a radar sensor, whereby the radar sensor comprises a pair of continuous wave (CW) radar transceivers that each has a leaky wave antenna that are provided adjacent to each other. Each CW radar transceiver comprises a microwave frequency transmission circuit configured to transmit and receive signals reflected off a nearby object. The transmitted and received signals are
(Continued)

then processed by the radar sensor to determine a relative displacement between the detected object and the radar sensor. This determined relative displacement may then be used with machine learning techniques to identify dynamic gestures made within the radar sensor's range of detection.

14 Claims, 18 Drawing Sheets

(51) Int. Cl.
    *G01S 13/38*         (2006.01)
    *G01S 13/42*         (2006.01)
    *G01S 7/03*          (2006.01)
    *G01S 7/41*          (2006.01)

(58) Field of Classification Search
CPC ...... G01S 13/343; G01S 13/42; G01S 13/536; G01S 13/931
See application file for complete search history.

(56) References Cited

U.S. PATENT DOCUMENTS

| | | | | |
|---|---|---|---|---|
| 2014/0300520 A1* | 10/2014 | Nguyen | ............. | H01Q 15/0066 343/739 |
| 2016/0329639 A1* | 11/2016 | Kasahara | ........... | H01Q 15/0086 |
| 2019/0020116 A1* | 1/2019 | Hammes | .............. | H01Q 9/0428 |

OTHER PUBLICATIONS

C. Caloz and T. Itoh, "Electromagnetic Metamaterials: Transmission Line Theory and Microwave Applications," in Electromagnetic Metamaterials: Transmission Line Theory and Microwave Applications: The Engineering Approach, 2005, p. 2.

K. T. Chandrasekaran, A. Alphones, M. F. Karim and Nasimuddin, "Graded index substrate integrated waveguide based directional coupler," 2017 IEEE International Symposium on Antennas and Propagation & USNC/URSI National Radio Science Meeting, San Diego, CA, 2017, pp. 2255-2256.

Che, W., Deng, K., Yung, E. K. N. and Wu, K. (2006), "H-plane 3-dB hybrid ring of high isolation in substrate-integrated rectangular waveguide (SIRW)." Microw. Opt. Technol. Lett., 48: 502-505.

M. Hall, E. Frank, G. Holmes, B. Pfahringer, P. Reutemann, and I. H. Witten "The WEKA data mining software: An update. SIGKDD Explorations" 11(1), 2009.

D. K. Karmokar, K. P. Esselle, and T. S. Bird, "Wideband Microstrip Leaky-Wave Antennas with Two Symmetrical Side Beams for Simultaneous Dual-Beam Scanning," IEEE Trans. Antennas Propag., vol. 64, No. 4, pp. 1262-1269, 2016.

Y. Li, Q. Xue, E. K. N. Yung, and Y. Long, "The periodic half-width microstrip leaky-wave antenna with a backward to forward scanning capability," IEEE Trans. Antennas Propag., vol. 58, No. 3, pp. 963-966, 2010.

Lindner, Stefan, et al. "Dual tone approach for unambiguous six-port based interferometric distance measurements." *2013 IEEE MTT-S International Microwave Symposium Digest (MTT)*. IEEE, 2013.

Mujumdar, Manisha D., Cheng Jin, and Arokiaswami Alphones. "Double periodic composite right/left handed transmission line based leaky wave antenna by singular perturbation method." *Progress in Electromagnetics Research* 132 (2012): 113-128.

N. Nasimuddin, Z. N. Chen, and X. Qing, Substrate integrated metamaterial-based leaky-wave antenna with improved boresight radiation bandwidth, IEEE Trans. Antennas Propag., vol. 61, No. 7, pp. 3451-3457, 2013.

P. Pan, F.-Y. Meng, and Q. Wu, "A composed right/left-handed waveguide with open-ended corrugations for backward-to-forward leaky-wave antenna application", vol. 50. 2008.

S. Paulotto, P. Baccarelli, F. Frezza, and D. R. Jackson, "Full-wave modal dispersion analysis and broadside optimization for a class of microstrip CRLH leaky-wave antennas," IEEE Trans. Microw. Theory Tech., vol. 56, No. 12, pp. 2826-2837, 2008.

Y. Qian, B. C. C. Chang, T. Itoh, K. C. Chen, and C. K. C. Tzuang, "High efficiency and broadband excitation of leaky mode in microstrip structures," 1999 IEEE MTT-S Int. Microw. Symp. Dig. (Cat. No.99CH36282), vol. 4, pp. 1419-1422, 1999.

Vinci, G., Lindner, S., Barbon, F., Weigel, R., & Koelpin, A. (2012). Promise of a better position. IEEE Microwave Magazine, 13(7), 41-49.

Xu, X., Bosisio, R. G., & Wu, K. (2005). "A new six-port junction based on substrate integrated waveguide technology." IEEE Transactions on Microwave Theory and Techniques, 53(7), 2267-2272.

\* cited by examiner

RADAR SENSOR

CROSS-REFERENCE TO RELATED APPLICATION

This application is a National Phase Application of PCT International Application No. PCT/SG2019/050360, International Filing Date Jul. 24, 2019, which claims the benefit of Singapore Patent Application No. 10201806351Y, entitled "A Microwave Based 3D Sensor for Dynamic Gesture Recognition" and filed on Jul. 25, 2018, each of which being expressly incorporated by reference herein in its entirety.

FIELD OF THE INVENTION

This invention relates to a radar sensor, whereby the radar sensor comprises a pair of continuous wave (CW) radar transceivers that each has a leaky wave antenna that are provided adjacent to each other. In particular, each CW radar transceiver comprises a microwave frequency transmission circuit configured to transmit and receive signals reflected off a nearby object. The transmitted and received signals are then processed by the radar sensor to determine a relative displacement between the detected object and the radar sensor. This determined relative displacement may then be used with machine learning techniques to identify dynamic gestures made within the radar sensor's range of detection.

BACKGROUND

With the rapid development of Internet-of-Things (IoT) and the increased use of mobile devices, interactions between humans and machines have become ever more convenient. This has led to the development of various forms of non-contact interactions with the aim of facilitating the ease of interactions between humans and machines/computers. The non-contact interactions allow for the dynamic gesture of a person to be easily recognized by a machine and for the machine to respond to the recognized dynamic gesture.

Various forms of non-contact interactions have been proposed by those skilled in the art such as optical high-resolution contactless distance measurement techniques or radar measurement techniques. Optical high-resolution measurement techniques usually involve laser interferometry or laser pulse time difference measurements and these techniques are advantageous as they provide highly accurate readings, high resolutions and wide dynamic ranges. However, such optical measurement techniques are unable to penetrate dust and fog in harsh environments as the optical diffusion in such environments cause measurement errors to occur.

Radar measurement systems were found to be more advantageous than optical measurement techniques as the measurement concept is based on the propagation and reflection of microwave signals as compared to the transmission of optical signals. Further, due to the technical advancements made in the fabrication of printed circuit boards (PCBs) and monolithic microwave integrated circuits (MMICs), the manufacturing costs of microwave circuits has reduced in the last decade. Therefore, it is has become more cost effective to produce a radar based MMIC measurement system than an equivalent optical measurement system.

Many radar techniques such as pulse and frequency modulated continuous wave (FMCW) radars have been in use for decades. Pulse radars work by emitting a short microwave impulse signal towards a target and when it hits the target, the signal gets reflected back to the transmitter. The received signal is delayed with respect to the signal transmitted by the transmitter and the length of the delay is dependent on the round-trip time of flight of the signal to the target and back. This means that if the round-trip flight time of the signal can be measured, the distance to the target can be effectively be derived. However, such a technique cannot be used for short-range measurements or high-precision distance detection due to the relatively low accuracy in very short-time interval measurements.

Unlike pulse radars, FMCW radars are configured to transmit a continuous microwave signal that is frequency-modulated. Due to the frequency modulation, the time delay between the transmitted signal and the reflected signal detected by the FMCW radar can be measured as a frequency difference between these two signals. However, in order for FMCW radar to achieve high spatial resolution at short distances, extremely steep frequency ramps are required to drive the radar as the steep frequency ramps allow the system to generate larger frequency shifts between the transmitted signal and the reflected signal. As such, the voltage controlled oscillators (VCOs) that are used for the FMCW radars are usually optimized for a continuous wave (CW) output at a stable resonant frequency with a long time constant of the resonating circuit to ensure accurate generation of the carrier frequency or optimized to be quickly tuned. The trade-off between these two properties results in the generation of a nonlinear output signal which is detrimental to the performance of the radar system.

In order to increase the measurement accuracy of FMCW radar systems, it has been proposed that an additional phase evaluation step be introduced to these radar systems. By detecting the phase shift of a reflected signal in relation to the phase of a transmitted signal, the spatial resolution of the radar system can be greatly improved. As a result, subwavelength resolutions have been achieved for existing radar systems through the use of additional phase measurement techniques in the baseband range. However, a phase ambiguity issue arises when the distance measured from a target is larger than a single wavelength. In such a scenario, the phase evaluation technique will produce an ambiguous result due to a periodical repetition over the distance variation as the radar system is unable to distinguish different distances whenever the corresponding phase difference exceeds one wavelength. In short, the displacement between the radar system and the target can only be measured when the target is within a range of a wavelength of the transmitted signal thereby severely limiting the radar system's range of detection.

For the above reasons, those skilled in the art are constantly striving to come up with a radar sensor with high spatial resolutions that can be used over a wide range.

SUMMARY OF THE INVENTION

The above and other problems are solved and an advance in the art is made by systems and methods provided by embodiments in accordance with the invention.

A first advantage of embodiments of systems and methods in accordance with the invention is that the radar sensor has a larger detectable range as compared to the detectable range of convention continuous wave (CW) transceivers.

A second advantage of embodiments of systems and methods in accordance with the invention is that the radar sensor is not affected by the phase ambiguity problem that is commonly faced by existing radar systems that utilize phase measurement techniques.

A third advantage of embodiments of systems and methods in accordance with the invention is that the measurements from the radar sensor may be combined with machine learning techniques to perform dynamic gesture recognition functions.

The above advantages are provided by embodiments of a system and a method in accordance with the invention operating in the following manner.

According to a first aspect of the invention, a radar sensor comprising a first and a second continuous wave (CW) radar transceiver is disclosed, whereby each CW radar transceiver comprises a voltage-controlled oscillator (VCO) configured to generate an output signal having a specific frequency and a divider circuit configured to divide the output signal from the VCO into a reference signal and a transmission signal. Each CW radar transceiver also has a double periodic composite right/left hand (CRLH) substrate integrated waveguide (SIW) leaky wave antenna configured to: receive the transmission signal from the divider circuit; transmit a backward or forward main beam, wherein a direction of the transmitted main beam is determined by the specific frequency of the received transmission signal, and when the main beam is reflected back to the antenna by an object adjacent the sensor, the antenna is further configured to generate a backscattered signal based on the reflected main beam. The divider circuit provided within each CW radar transceiver is further configured to divide the backscattered signal received from the antenna and a six-port interferometer, provided within each CW radar transceiver, is configured to receive, by input ports of the six-port interferometer, the reference signal and the divided-backscattered signal from the divider circuit, whereby the six-port interferometer is configured to generate, based on the received reference and divided-backscattered signals, power signals at output ports of the six-port interferometer whereby the power signals are used for computing relative displacement L between the object and the radar sensor. Further, the double periodic CRLH SIW leaky wave antenna of the first CW radar transceiver is positioned adjacent the double periodic CRLH SIW leaky wave antenna of the second CW radar transceiver and the VCOs of the first and second CW radar transceivers are each tuned to generate output signals that each have a different specific frequency such that a direction of a main beam of the double periodic CRLH SIW leaky wave antenna of the first CW radar transceiver and a direction of a main beam of the double periodic CRLH SIW leaky wave antenna of the second CW radar transceiver are the same.

With reference to the first aspect of the invention, the six-port interferometer comprises a first power divider having an input port coupled to the divider circuit to receive the reference signal; a first directional coupler having an input port coupled to an output port of the first power divider and having two output ports; a second directional coupler having an input port coupled to another output port of the first power divider and having two output ports; a second power divider having an input port coupled to the divider circuit to receive the divided-backscattered signal, and having an output port coupled to an input port of a wideband phase shifter, and having another output port coupled to another input port of the second directional coupler, wherein an output port of the wideband phase shifter is coupled to another input port of the first directional coupler.

With reference to the first aspect of the invention, gradient index (GRIN) substrates are provided at coupling regions of the first and second directional couplers.

With reference to the first aspect of the invention, the divider circuit comprises a power divider configured to divide the output signal from the VCO equally into the reference signal and a divided output signal, and to provide the reference signal to one of the input ports of the six-port interferometer; a rat race coupler configured to receive the divided output signal at a sum port of the rat race coupler and to generate the transmission signal at a first port of the rat race coupler; and the rat race coupler is further configured to receive, from the antenna, the backscattered signal at the first port of the rat race coupler and to produce the backscattered signal at a difference port of the rat race coupler, whereby the difference port is coupled to another one of the input ports of the six-port interferometer.

With reference to the first aspect of the invention, a central coupling region of the rat race coupler comprises regions having varying values of permittivity.

With reference to the first aspect of the invention, the double periodic CRLH SIW leaky wave antenna of the first CW radar transceiver is positioned back-to-back with the double periodic CRLH SIW leaky wave antenna of the second CW radar transceiver.

With reference to the first aspect of the invention, the radar sensor further comprises a computing module coupled to the output ports of the six-port interferometers of the first and second CW radar transceivers, the computing module being configured to use the power signals from the first and second CW radar transceivers to compute the relative displacement L between the object and the radar sensor.

According to a second aspect of the invention, a method for determining relative displacement L between an object and a radar sensor using a first and a second continuous wave (CW) radar transceiver provided within the radar sensor is disclosed, whereby the method comprises generating, by a voltage-controlled oscillator (VCO) provided within each CW radar transceiver, an output signal having a specific frequency; dividing, by a divider circuit provided within each CW radar transceiver, the output signal from the VCO into a reference signal and a transmission signal; receiving, by a double periodic composite right/left hand (CRLH) substrate integrated waveguide (51 W) leaky wave antenna provided within each CW radar transceiver, the transmission signal from the divider circuit and transmitting a backward or forward main beam, wherein a direction of the transmitted main beam is determined by the specific frequency of the received transmission signal, and when the main beam is reflected back to the antenna by an object adjacent the sensor, generating, by the CRLH SIW leaky wave antenna, a backscattered signal based on the reflected main beam; dividing, by the divider circuit, the backscattered signal received from the antenna; receiving, by input ports of a six-port interferometer provided within each CW radar transceiver, the reference signal and the divided-backscattered signal from the divider circuit, whereby the six-port interferometer generates power signals at output ports of the six-port interferometer based on the received reference and divided-backscattered signals, the power signals being used for computing relative displacement L between the object and the radar sensor. Further, the double periodic CRLH SIW leaky wave antenna of the first CW radar transceiver is positioned adjacent the double periodic CRLH SIW leaky wave antenna of the second CW radar transceiver and the VCOs of the first and second CW radar transceivers are each tuned to generate output signals that each have a different specific frequency such that the main beam of the double periodic CRLH SIW leaky wave antenna of the first CW radar transceiver and the main beam of the double periodic CRLH SIW leaky wave antenna of the second CW radar transceiver are pointing at a same direction.

With reference to the second aspect of the invention, the six-port interferometer comprises a first power divider having an input port coupled to the divider circuit to receive the reference signal; a first directional coupler having an input port coupled to an output port of the first power divider and two output ports; a second directional coupler having an input port coupled to the output port of the first power divider and two output ports; a second power divider having an input port coupled to the divider circuit to receive the divided-backscattered signal, and having an output port coupled to an input port of a wideband phase shifter, and having another output port coupled to another input port of the second directional coupler, wherein an output port of the wideband phase shifter is coupled to another input port of the first directional coupler.

With reference to the second aspect of the invention, gradient index (GRIN) substrates are provided at coupling regions of the first and second directional couplers.

With reference to the second aspect of the invention, the dividing by the divider circuit comprises dividing, by a power divider provided within each CW radar transceiver, the output signal from the VCO equally into the reference signal and a divided output signal, and providing the reference signal to one of the input ports of the six-port interferometer; receiving, by a rat race coupler provided within each CW radar transceiver, the divided output signal at a sum port of the rat race coupler and generating the transmission signal at a first port of the rat race coupler; and receiving from the antenna, by the rat race coupler, the backscattered signal at the first port of the rat race coupler and producing the backscattered signal at a difference port of the rat race coupler, whereby the difference port is coupled to another one of the input ports of the six-port interferometer.

With reference to the second aspect of the invention, a central coupling region of the rat race coupler comprises regions having varying values of permittivity.

With reference to the second aspect of the invention, the double periodic CRLH SIW leaky wave antenna of the first CW radar transceiver is positioned back-to-back with the double periodic CRLH SIW leaky wave antenna of the second CW radar transceiver.

With reference to the second aspect of the invention, the method further comprises computing, by a computing module that is provided within each of the first and second CW radar transceivers and that is coupled to the output ports of the six-port interferometer provided within each of the first and second CW radar transceivers, the relative displacement L between the object and the radar sensor based on the power signals received from the six-port interferometers of the first and second CW radar transceivers.

BRIEF DESCRIPTION OF THE DRAWINGS

The above advantages and features in accordance with this invention are described in the following detailed description and are shown in the following drawings.

DETAILED DESCRIPTION

This invention relates to a radar sensor and a method for using the radar sensor for detecting nearby objects and in embodiments of the invention, the radar sensor may be used for dynamic gesture recognition and one skilled in the art will recognize that the radar sensor may be used for other similar applications without departing from this invention. In particular, the radar sensor comprises a pair of continuous wave (CW) radar transceivers that each has a leaky wave antenna that are provided adjacent to each other.

In a more particular embodiment, each CW radar transceiver in the radar sensor comprises a voltage-controlled oscillator (VCO), a divider circuit, a double periodic composite right/left hand (CRLH) substrate integrated waveguide (SIW) leaky wave antenna, and a six-port interferometer whereby the double periodic CRLH SIW leaky wave antenna of the first CW radar transceiver is positioned adjacent the double periodic CRLH SIW leaky wave antenna of the second CW radar transceiver.

In operation, the VCOs of the first and second CW radar transceivers are each tuned by varying its input voltage to generate output signals that each have a different specific frequency such that a direction of a main beam of the double periodic CRLH SIW leaky wave antenna of the first CW radar transceiver and a direction of a main beam of the double periodic CRLH SIW leaky wave antenna of the second CW radar transceiver are the same. In each CW radar transceiver, the signal from the VCO is provided to the divider circuit which is configured to divide the signal into a reference signal and a transmission signal. The double periodic CRLH SIW leaky wave antenna is then used to transmit the transmission signal and subsequently used to receive a signal reflected off a nearby object.

The six-port interferometer is then used to compare the reflected signal received by the leaky wave antenna with the reference signal provided by the divider circuit to determine a phase difference between the reflected signal and the reference signal. The phase difference obtained from each CW radar transceiver is then used to compute the relative displacement between the detected object and the radar sensor. This determined relative displacement may then be used with machine learning techniques to identify dynamic gestures made within the radar sensor's range of detection or any other similar types of movements or moving objects.

Figure 1A:
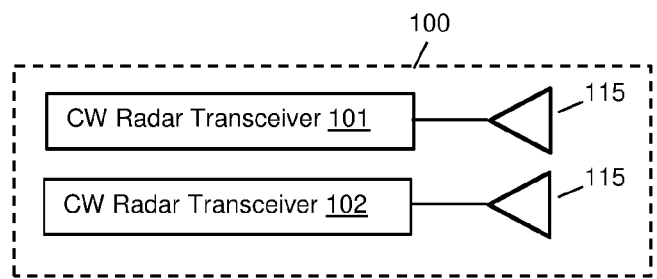
FIG. 1(a) illustrating a block diagram representative of a radar sensor in accordance with embodiments of the invention.

FIG. 1(a) illustrates a block diagram representative of a radar sensor in accordance with embodiments of the invention. Radar sensor 100 comprises first continuous wave (CW) radar transceiver 101 and second CW radar transceiver 102 which are arranged such that the double periodic CRLH SIW leaky wave antennas 115 of both CW radar transceivers are located adjacent to each other.

Figure 1B:
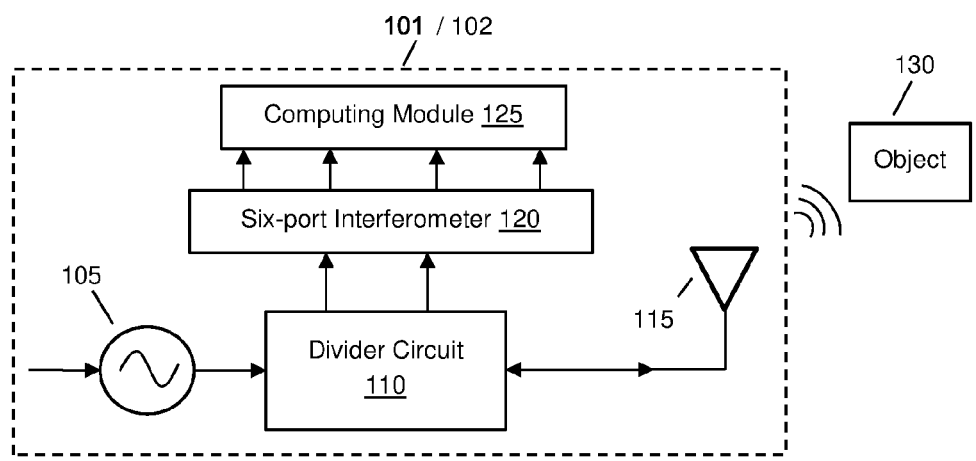
FIG. 1(b) illustrating a block diagram representative of a continuous wave (CW) radar transceiver of a radar sensor in accordance with embodiments of the invention.

FIG. 1(b) illustrates a block diagram representative of CW radar transceiver 101/102 of radar sensor 100 in accordance with embodiments of the invention. CW radar transceiver 101/102 each comprise voltage-controlled oscillator (VCO) 105, divider circuit 110, double periodic composite right/left hand (CRLH) substrate integrated waveguide (SIW) leaky wave antenna 115, six-port interferometer 120 and computing module 125. VCO 105 is an electronic oscillator whose instantaneous oscillation frequency may be determined by the input voltage applied to VCO 105. This means that the frequency of the output signal from VCO 105 may be varied over a wide frequency spectrum by simply varying VCO 105's input voltage.

In embodiments of the invention, VCO 105 is configured to generate a microwave frequency output signal. In further embodiments of this invention, the output signal generated by VCO 105 has a frequency range between 8 GHz and 14 GHz. The output signal generated by VCO 105 is then provided to divider circuit 110. One skilled in the art will recognize that VCO 105 may be configured to generate signals having other frequency values without departing from this invention.

In accordance with embodiments of the invention, divider circuit 110 comprises any combination of components or logic circuits that are configured to equally divide the output signal from VCO 105 into a reference signal and a transmission signal. The transmission signal from divider circuit 110 is then provided to double periodic CRLH-SIW leaky wave antenna 115 while the reference signal is provided to six-port interferometer 120. The detailed working of double periodic CRLH-SIW leaky wave antenna 115 will be described in greater detail in the later part of this description. Upon receiving the transmission signal, leaky wave antenna 115 will emit a radiation pattern whereby the main beam of the radiated pattern may be in a forward, broadside, or backward direction relative to leaky wave antenna 115. In accordance with embodiments of the invention, the direction of the radiated main beam is determined by the frequency of the transmission signal received by leaky wave antenna 115.

When the radiated main beam is reflected by object 130, which is located adjacent CW radar transceiver 101/102, the reflected main beam will be detected by leaky wave antenna 115. Leaky wave antenna 115 will then generate a backscattered signal based on the detected reflected main beam and this backscattered signal will be provided to six-port interferometer 120 through divider circuit 110.

Six-port interferometer 120 will then utilize the reference signal and the backscattered signal to generate power signals at each of its four output ports. The detailed configuration of six-port interferometer 120 will be described later on in the description. The four output ports of interferometer 120 are coupled to computing module 125, and computing module 125 is configured to compute the phase difference between the reference signal and the backscattered signal and the relative displacement L between object 130 and CW radar transceiver 101/102 using the received power signals.

In embodiments of the invention, in order to enhance the detectable range of radar sensor 100, when leaky wave antenna 115 of CW radar transceiver 101 radiates a first signal having a first resonance frequency along a specific direction, a corresponding leaky wave antenna 115 of CW radar transceiver 102 will also be configured to radiate a second signal having a second resonance frequency along the same specific direction. It should be noted that the first resonance frequency of the first signal radiated by CW radar transceiver 101 is not equal to the second resonance frequency of the second signal radiated by CW radar transceiver 102 (a frequency-spacing of $f_{space}$ exists between these two radiated signals) even though both first and second signals are radiated along the same direction.

The phase difference between the radiated signals and the received backscattered signals for the first and second signals are then computed by computing modules 125 of CW radar transceivers 101 and 102 respectively. The measurements obtained from computing modules 125 of CW radar transceivers 101 and 102 are then used to compute the phase of the beat frequency or the phase of frequency-spacing $f_{space}$. A distance calculation is then carried out using the computed phase of the beat frequency by computing module 125 in either CW radar transceiver 101 or 102. By doing so, radar sensor 100 is able to effectively address the phase ambiguity problem that is commonly faced by CW transceivers thereby effectively increasing its range of detection beyond one wavelength of the radiated signal.

Figure 2:
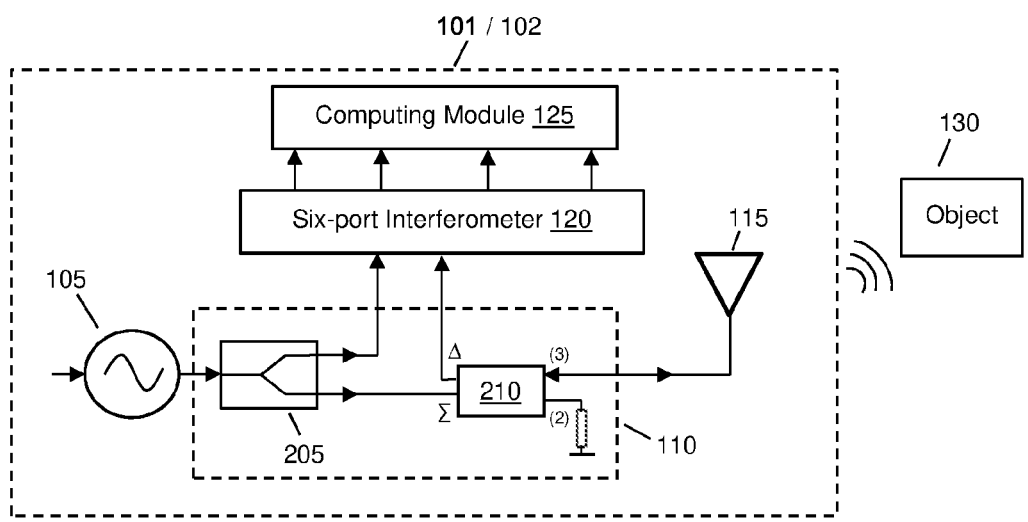
FIG. 2 illustrating a block diagram representative of the divider circuit of the continuous wave (CW) radar transceiver illustrated in FIG. 1(b) in accordance with embodiments of the invention.

FIG. 2 illustrates a block diagram representative of an embodiment of divider circuit 110 (as illustrated in FIG. 1(b)) of CW radar transceiver 101 or 102. Divider circuit 110 may comprise power divider 205 and rat-race coupler 210. Power divider 205 is configured to equally divide a signal received from VCO 105 into a reference signal that is provided to six-port interferometer 120 and a divided output signal that is provided to rat-race coupler 210. Rat-race coupler 210 comprises four ports, i.e. port one—which may also be identified as the sum Σ port, port two (2), port three (3), and port four—which may be known as the difference Δ port. When a signal is applied to port one (i.e. the sum Σ port), the signal will be evenly split into two in-phase components at ports two and three while port four will be isolated. If the signal were to be applied to port four instead, the signal will be evenly split into two components with a 180° phase difference at ports two and three with port one being isolated. Alternatively, if two input signals are applied at ports two and three respectively, the sum of these two signals will be formed at port one (i.e. at the sum Σ port) while the difference between these two signals will be formed at port four (i.e. at the difference Δ port).

As illustrated in FIG. 2, the sum Σ port is coupled to one of the outputs of power divider 205, the difference Δ port is coupled to an input port of six-port interferometer 120, the port two (2) is terminated to ground and the port three (3) is coupled to leaky wave antenna 115. Hence, when the divided output signal is provided from power divider 205 to the sum Σ port, i.e. port one, of rat-race coupler 210, the divided output signal is evenly split into two in-phase signals at ports two (2) and three (3). The signal from port three (3), which is defined as the transmission signal, is then provided to leaky wave antenna 115.

Rat-race coupler 210 is also configured to receive via port three (3) a backscattered signal from leaky wave antenna 115 whereby the backscattered signal is generated based on the reflected signal that was detected by leaky wave antenna 115. The backscattered signal is then produced at the difference Δ port and subsequently provided to the input port of six-port interferometer 120 to be further processed as previously described. In embodiments of the invention, a central coupling region of the rat race coupler comprises regions having varying values of permittivity and this allows the rat race coupler to achieve a wide bandwidth or arbitrary power splitting ratio.

The Double Periodic Composite Right/Left Hand (CRLH) Substrate Integrated Waveguide (SIW) Leaky Wave Antenna (LWA)

The detailed working of double periodic CRLH-SIW leaky wave antenna 115 is described in greater detail in this section. As known to one skilled in the art, a leaky wave antenna (LWA) is a travelling wave structure embedded periodically with resonators (such as slots). The arrangement, periodicity and the orientation of the resonators determine the radiation characteristics of the LWA and as such, LWAs are able to specify the direction of radiation of their main beam by changing the frequency of the signal provided to the LWAs.

Composite Right/Left Hand (CRLH) transmission lines are structures that exhibit left-handed radiation behaviour over a specific input frequency range and right-handed radiation behaviour over a specific input frequency range. The left-handed radiation behaviour is achieved by incorporating a series capacitance and a shunt inductance in the right handed host medium. Hence, CRLH structures have been integrated in Substrate Integrated Waveguide (SIW) based leaky wave antennas to achieve backward to forward beam scanning. In embodiments of the invention, Double Periodic (DP) CRLH SIW based leaky wave antennas have been designed. DPCRLH SIW leaky wave antennas possess an additional right handed leaky wave region at a lower frequency range in addition to the left handed leaky wave region and the right handed leaky wave region of a conventional CRLH-SIW leaky wave structure. In embodiments of the invention, leaky wave antenna 115 comprises such a DPCRLH SIW leaky wave antenna whereby the direction of radiation of this antenna's main beam may be specified by changing the frequency of the signal provided to leaky wave antenna 115.

Leaky wave antenna 115 in accordance with embodiments above is designed by loading a guided wave structure such as a Substrate Integrated Waveguide (SIW) periodically with resonating structures. Leaky wave antenna 115 is made up of a number of unit cells whereby the orientation and the total number of unit cells determine the properties of leaky wave antenna 115 such as its main beam angle, gain, polarization, etc. The unit cell of the DPCRLH-SIW structure is a single-layered SIW structure with longitudinal and transverse slots whereby the size of the slots are modulated to achieve double periodic characteristics.

Figure 3A:
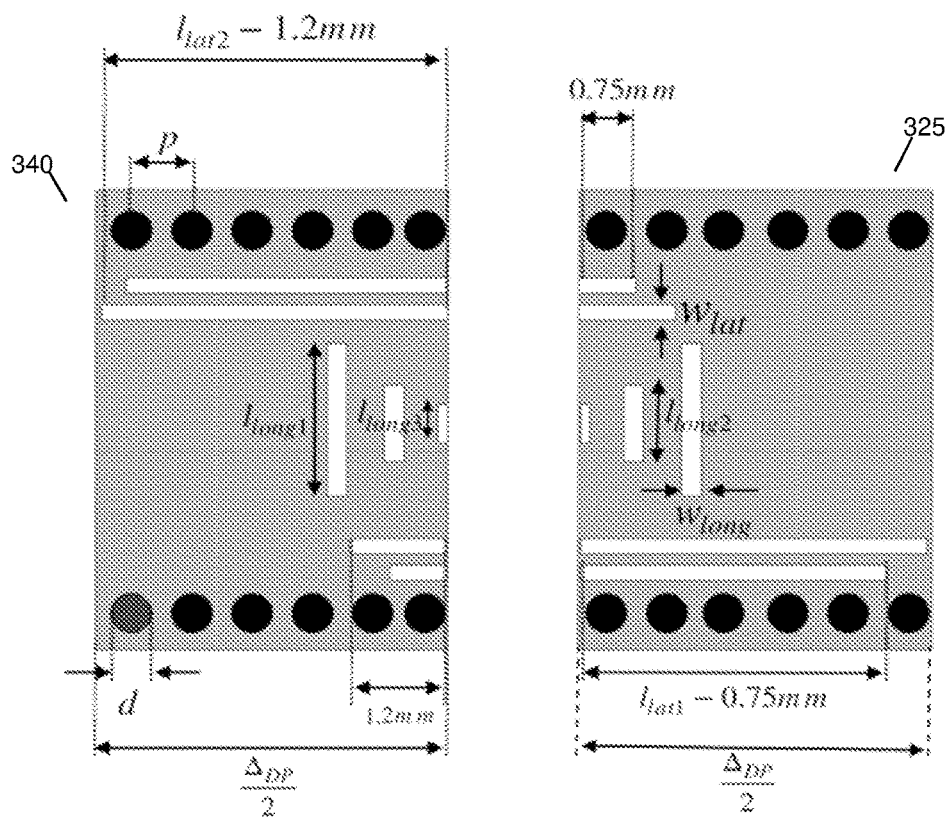
FIG. 3(a) illustrating a unit cell of the double periodic CRLH-SIW leaky wave antenna in accordance with embodiments of the invention.

The layout of a unit cell proposed in this work comprises two sub-unit cells and this is shown as sub-unit cell 325 and sub-unit cell 340 in FIG. 3(a) whereby the overall unit cell structure (i.e. a combination of sub-unit cells 325 and 340) comprises a single-layered structure that has longitudinal and lateral slots. The two-sub unit cells 325 and 340 provide the design with 4 degrees of freedom thereby allowing leaky wave antenna 115 to achieve the desired dispersion characteristics and radiation performance. The sizes of the longitudinal slots are modulated along the length of the unit cell to achieve the required dispersion characteristics. In an embodiment of the invention, the substrate that is used for the design of leaky wave antenna 115 is Rogers 4003C (h=0.8128 mm, δ=0.0027, $\in_r$=3.55) where (with reference to FIG. 3(a)) the values used for the DPCRLH SIW unit cell are as follows: p=1.5 mm, d=1 mm, $l_{lat1}$=9 mm, $l_{lat2}$=9.9 mm, $w_{lat}$=0.4 mm, $l_{long1}$=4 mm, l=2 mm, $l_{long3}$=1 mm, $w_{long}$=0.5 mm and $\Delta_{DP}$=17.5 mm.

Figure 3B:
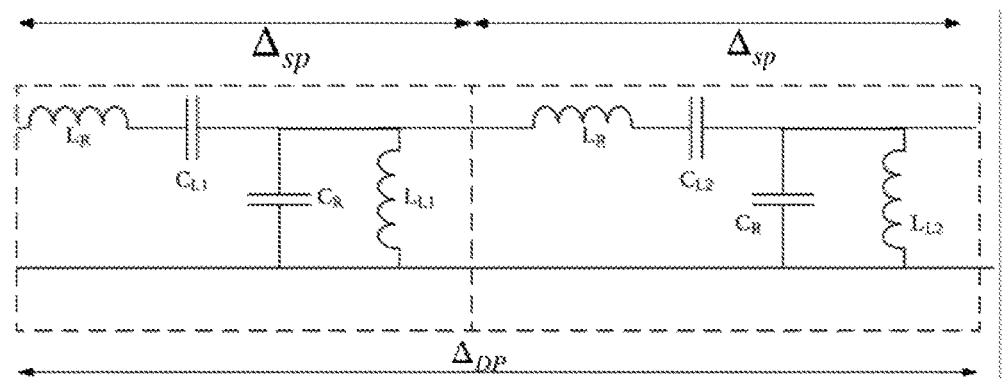
FIG. 3(b) illustrating the circuit diagram of a unit cell of the double periodic CRLH-SIW leaky wave antenna in accordance with embodiments of the invention.

An equivalent circuit of the double periodic CRLH unit cell is illustrated in FIG. 3(b) where $L_R$ and $C_R$ are the series inductance and shunt capacitance of the right-handed host medium while $L_{L1}$, $C_{L1}$, $L_{L2}$ and $C_{L2}$ are the left-handed parameters of the DPCRLH unit cell. $\Delta_{sp}$ and $\Delta_{DP}$ are the periods of the sub-unit cell and the super-unit cell respectively.

Figure 3C:
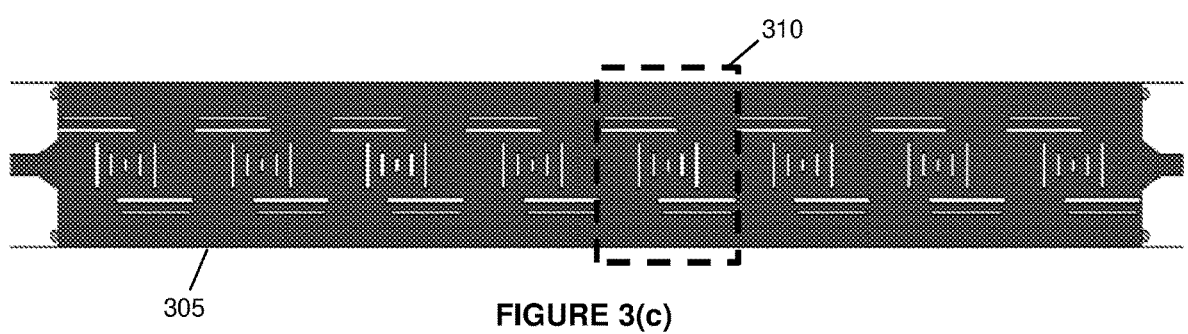
FIG. 3(c) illustrating a double periodic composite right/left hand (CRLH) substrate integrated waveguide (SIW) leaky wave antenna in accordance with embodiments of the invention.

In embodiments of the invention, the double periodic CRLH-SIW leaky wave antenna 115 used in CW radar transceivers 101 and 102 comprises eight cascaded unit cells. The antenna measures $5.16\lambda_0 \times 0.8\lambda_0 \times 0.0271\lambda_0$, where $\lambda_0$ represents the free space wavelength. In this embodiment of the invention, the free space wavelength, $\lambda_0$ may be computed for a resonant frequency at 10 GHz and the fabricated prototype 305 is shown in FIG. 3(c) where 310 represents one of the fabricated unit cells. The fabricated prototype 305 is fed using a 50 microstrip line with a tapered transition for matching the SIW input impedance.

Figure 4:
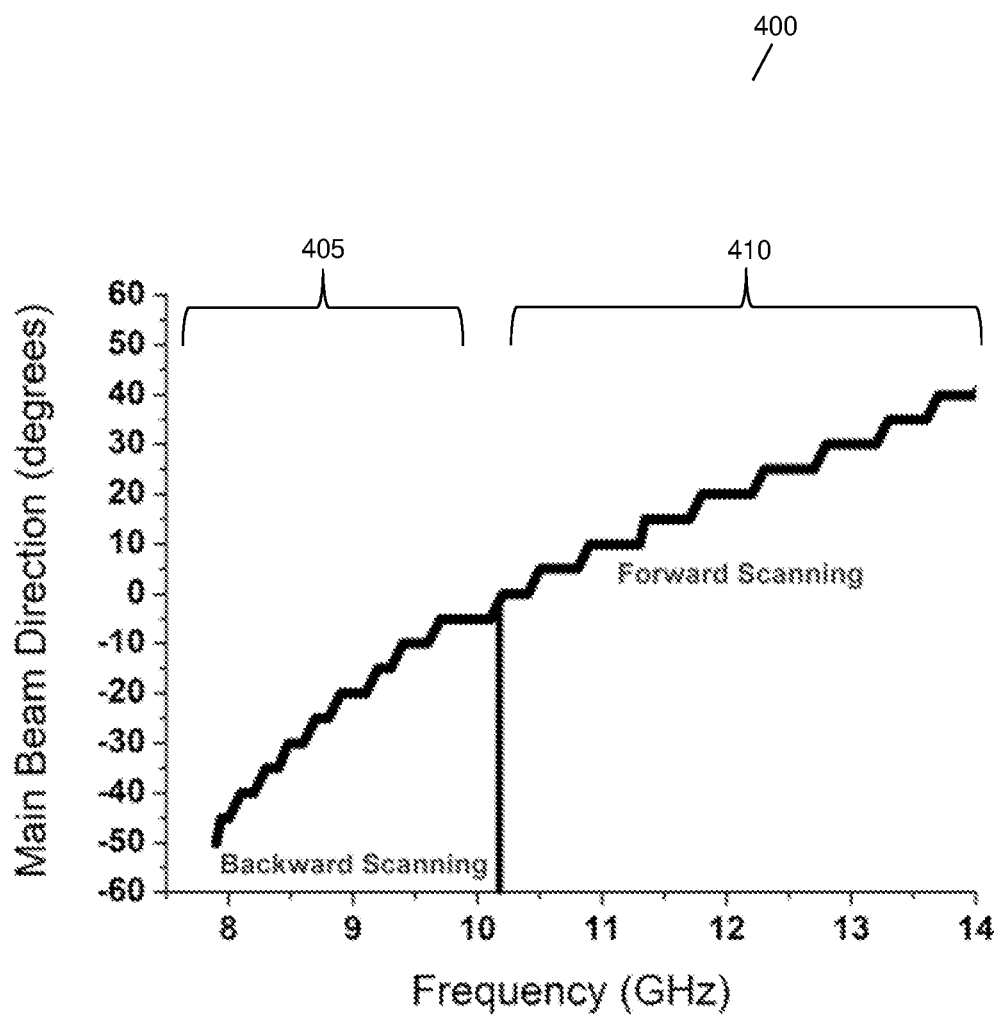
FIG. 4 illustrating beam scanning angles of the double periodic CRLH-SIW leaky wave antenna with respect to varying input frequency in accordance with embodiments of the invention.

FIG. 4 illustrates simulated beam scanning angles of leaky wave antenna 115 based on the parameters described above with respect to variations in the input frequency. Based on plot 400, it can be observed that almost uniform behaviour is achievable in the lefthanded region 405 and in the righthanded region 410. For this simulation, the range of the beam scanning angle is between −45 degrees and 45 degrees over the frequency range 7.9 GHz to 14 GHz and it can be seen that the main beam transitions from the lefthanded region 405 to the righthanded region around 10 GHz. This wide coverage of −45 degrees to 45 degrees ensures that the main beam of leaky wave antenna 115 is able to scan the entire surface area of an object adjacent the radar sensor.

Figure 5:
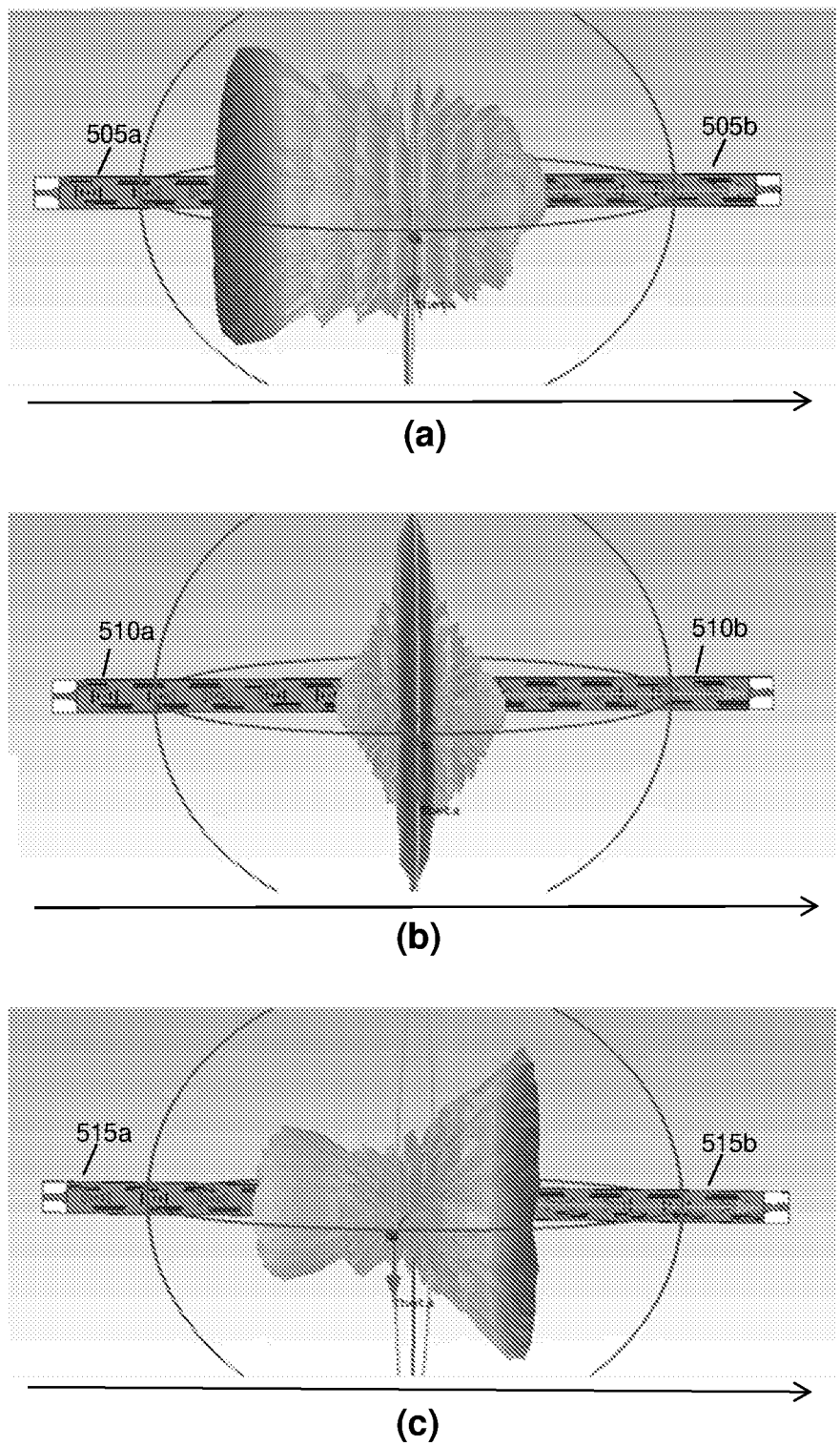
FIG. 5(a) illustrating a simulated far-field radiation pattern of the double periodic CRLH-SIW leaky wave antenna when the antenna is operated in backward scanning mode in accordance with embodiments of the invention.
FIG. 5(b) illustrating a simulated far-field radiation pattern of the double periodic CRLH-SIW leaky wave antenna when the antenna is operated in broadside scanning mode in accordance with embodiments of the invention.
FIG. 5(c) illustrating a simulated far-field radiation pattern of the double periodic CRLH-SIW leaky wave antenna when the antenna is operated in forward scanning mode in accordance with embodiments of the invention.

The simulated far-field radiation patterns for various input frequencies are illustrated in FIG. 5 for two leaky wave antennas that are placed adjacent to each other, in a back-to-back configuration. In other words, for this simulation, the back part of a leaky wave antenna 115 of CW radar transceiver 101 is placed facing the back part of a leaky wave antenna 115 of CW radar transceiver 102 (in a back-to-back arrangement) so that the two main beams radiated by leaky wave antennas 115 of CW radar transceiver 101 and 102 respectively will be in the same direction, even though the frequency of the signal transmitted by leaky wave antenna 115 of CW radar transceiver 101 is different from the frequency of the signal transmitted by leaky wave antenna 115 of CW radar transceiver 102. In embodiments of the invention, leaky wave antenna 115 of CW radar transceiver 101 is located no more than, λ/2, half a wavelength, away from the leaky wave antenna 115 of CW radar transceiver 102 where λ represents the free space wavelength. In this embodiment of the invention, the free space wavelength, λ may be calculated for a resonant frequency at 10 GHz.

Table 1 below shows the various frequencies of signals at leaky way antennas 115 of CW radar transceiver 101 and 102 respectively for various main beam directions.

TABLE 1

| $\phi_m$ (Degrees) | Frequency of Signal Provided to Leaky Wave Antenna 115 of CW radar transceiver 101 (GHz) | Frequency of Signal Provided to Leaky Wave Antenna 115 of CW radar transceiver 102 (GHz) |
| --- | --- | --- |
| −45 | 8 | 14 |
| −30 | 8.6 | 13 |
| −20 | 9.1 | 12.2 |
| 0 | 10.3 | 10.3 |
| 20 | 12.2 | 9.1 |
| 30 | 13 | 8.6 |
| 45 | 14 | 8 |

From Table 1, it can be seen that although the frequency of a signal provided to leaky wave antenna 115 of CW radar transceiver 101 is different from the frequency of a signal provided to leaky wave antenna 115 of CW radar transceiver 102, it is possible for the main beams of both leaky wave antennas 115 to be along the same direction, provided that the two antennas are arranged back-to-back or alternatively in a forward-to-forward arrangement. One skilled in the art will recognize that the leaky wave antennas may be arranged in other configurations or arrangements or may be configured to transmit signals having other resonance frequencies without departing from this invention, as long as there exists a frequency difference between the signals that are being transmitted by the respective leaky wave antennas and as long as the main beams of both antennas are radiated along the same direction.

FIG. 5(a) illustrates the simulated far-field radiation pattern of the double periodic CRLH-SIW leaky wave antennas 505a and 505b when leaky wave antenna 505a is operated in backward scanning mode and leaky wave antenna 505b is operated in a forward scanning mode such that it can be understood that the combined direction of the simulated far-field radiation pattern is in an overall backward direction.

Alternatively, the leaky wave antennas may also be configured to radiate beams along a general broadside direction.

FIG. 5(b) illustrates the simulated far-field radiation pattern of the double periodic CRLH-SIW leaky wave antennas 510a and 510b when leaky wave antenna 510a is operated in broadside scanning mode and leaky wave antenna 510b is operated in a broadside scanning mode such that it can be understood that the combined direction of the simulated far-field radiation pattern is in an overall broadside direction.

The leaky wave antennas may also be configured to radiate beams along a general broadside forward direction, thereby showing that such an arrangement of leaky wave antennas 115 greatly increases its overall detection range. FIG. 5(c) illustrates the simulated far-field radiation pattern of the double periodic CRLH-SIW leaky wave antennas 515a and 515b when leaky wave antenna 515a is operated in backward scanning mode and leaky wave antenna 515b is operated in a forward scanning mode such that it can be understood that the combined direction of the simulated far-field radiation pattern is in an overall backward direction.

A dispersion diagram for a single double periodic CRLH unit cell as shown previously in FIGS. 3(a) and 3(b) may be obtained using full wave simulation. It can also be said that the dispersion diagram may be used to determine the physical dimensions of the antenna. The physical dimensions of the antenna are estimated by determining the dispersion diagram for different sets of parameters. The ABCD matrix may be determined for the unit cell and the propagation constant, $\gamma$, may be determined using the following equation (1).

$$\gamma \Delta_{DP} = (\alpha + i\beta)\Delta_{DP} = \cosh^{-1}\left(\frac{A+D}{2}\right) \quad \text{Equation (1)}$$

where $\alpha$ is the attenuation constant, $\beta$ is the phase constant, and parameters A and D are transmission parameters.

Figure 6A:
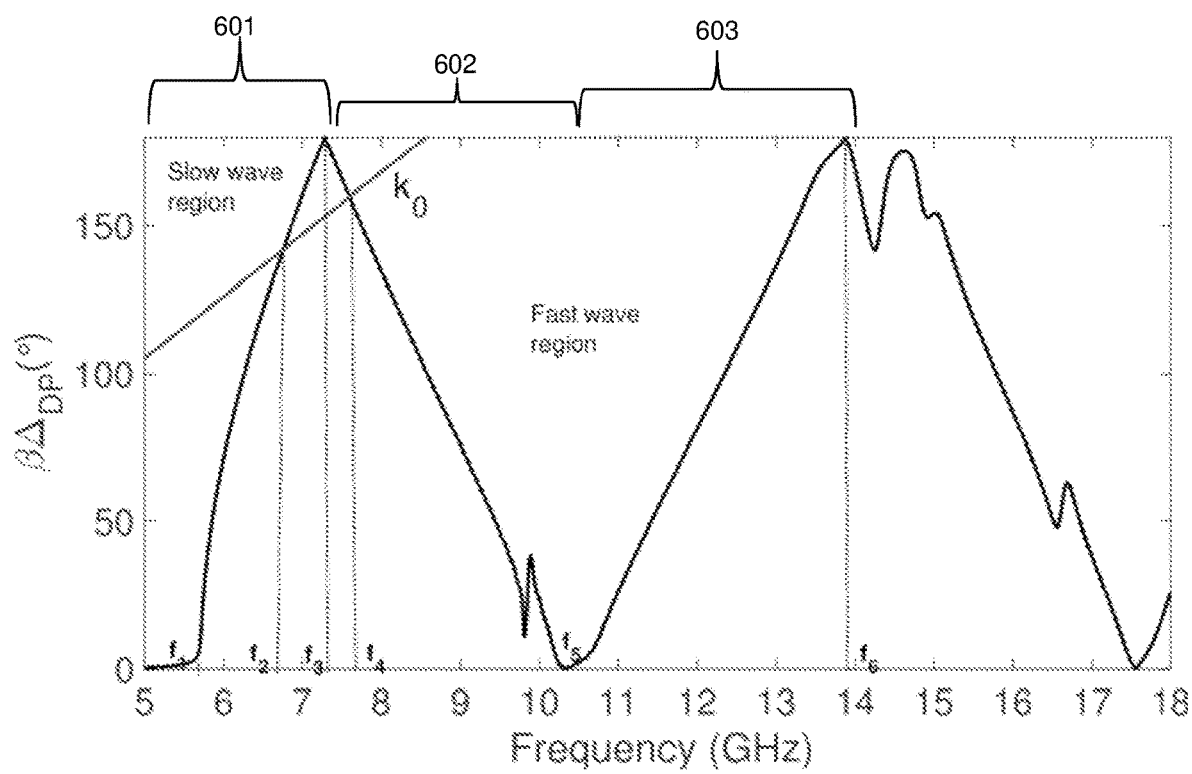
FIG. 6(a) illustrating a dispersion diagram of a unit cell of the double periodic CRLH-SIW leaky wave antenna in accordance with embodiments of the invention.
Figure 6B:
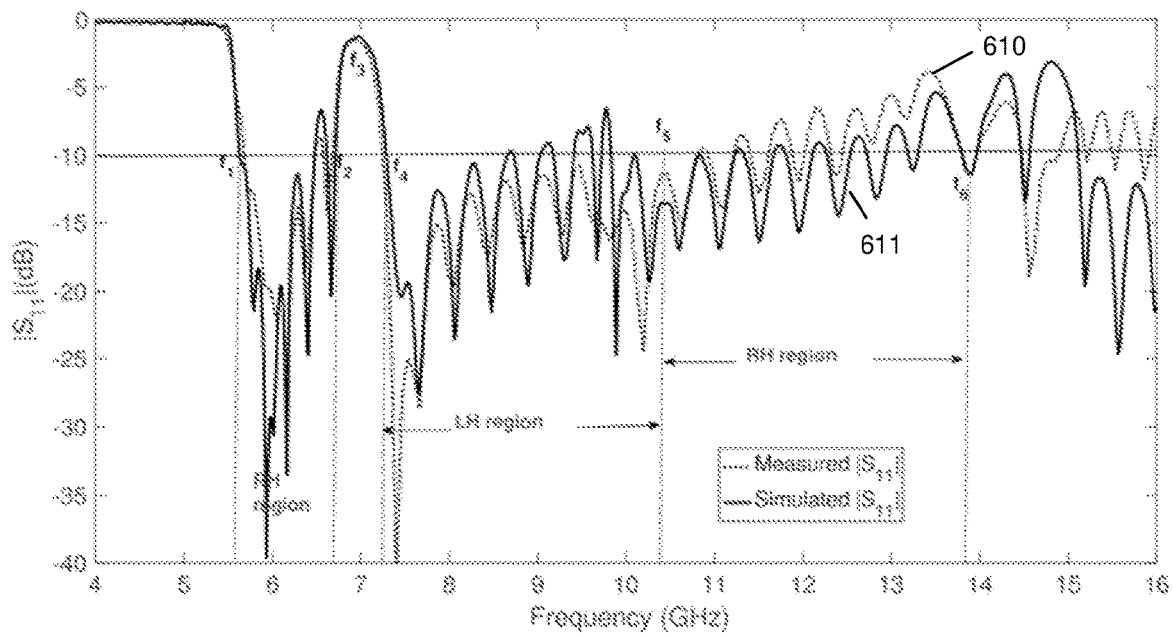
FIG. 6(b) illustrating the simulated and measured reflection coefficient, $S_{11}$ of the double periodic CRLH-SIW leaky wave antenna in accordance with embodiments of the invention.

It can be seen from the dispersion diagram illustrated in FIG. 6(a) that there are three distinct operating ranges. The first right-handed region 601 ranges from $f_1$=5.7 GHz to $f_3$=7.3 GHz, the first left-handed region ranges from $f_3$=7.3 GHz to $f_5$=10.37 GHz and the second right-handed region 603 ranges from $f_5$=10.37 GHz to $f_6$=13.87 GHz. It can be observed from FIG. 6(a) that the bandwidth of the first left-handed region 602 between $f_5$ and $f_3$ is about 3.1 GHz and the bandwidth of the second right-handed region 603 is between $f_6$ and $f_5$ is about 3.5 GHz, i.e. the bandwidths of these two regions are almost the same. This implies the following:

$$\left|\left(\frac{\Delta\beta}{\Delta f}\right)LH\right| \approx \left|\left(\frac{\Delta\beta}{\Delta f}\right)RH\right| \quad \text{Equation (2)}$$

The radiation cone of the leaky wave antenna is determined using the air-line equation ($k_0 = \omega_0 \sqrt{\varepsilon_0 \mu_0}$), where the region inside the radiation cone is the fast wave region/leaky wave region that determines the frequency range in which double periodic CRLH transmission line structure radiates. In other words, as illustrated in FIG. 6(a), the first right-handed leaky wave region 601 extends from $f_1$=5.7 GHz to $f_2$=6.73 GHz, the left-handed leaky wave region 602 extends from $f_4$=7.6 GHz to $f_5$=10.37 GHz and the second right-handed leaky wave region 603 extends from $f_5$=10.37 GHz to $f_6$=13.87 GHz.

Figure 6C:
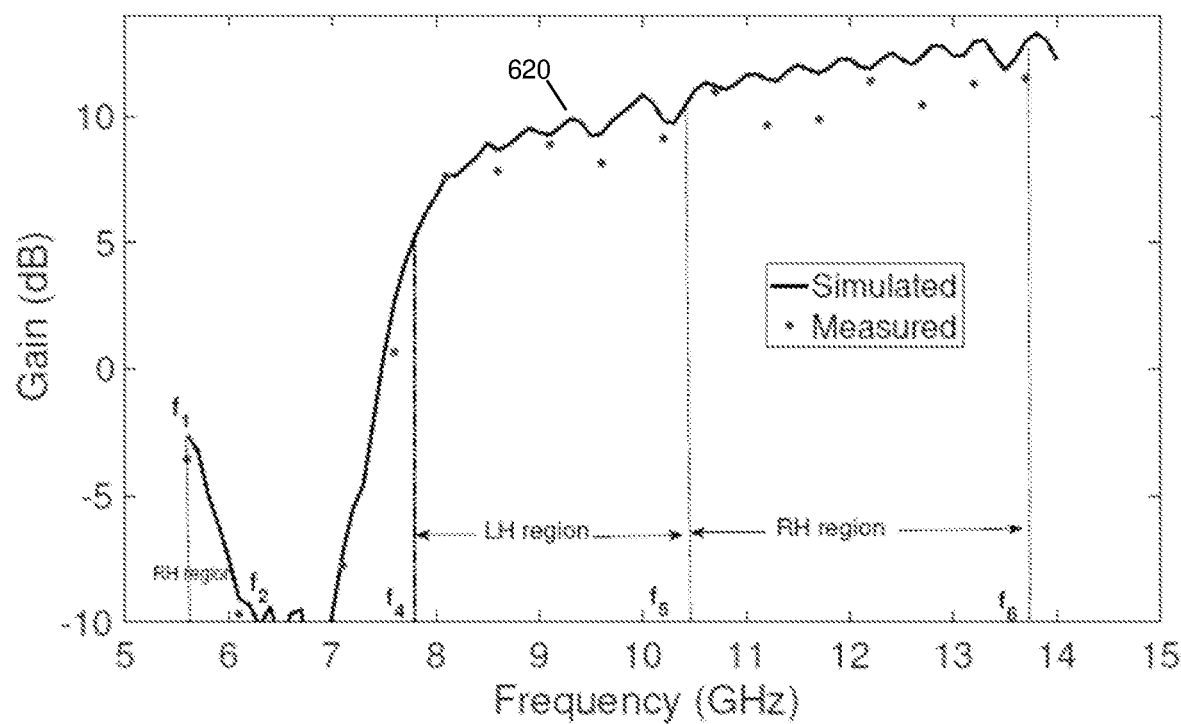
FIG. 6(c) illustrating the simulated and measured gain, $S_{21}$ of the double periodic CRLH-SIW leaky wave antenna in accordance with embodiments of the invention.

Based on the above parameters, the simulated $|S_{11}|$ plot 611 and measured $|S_{11}|$ plot 610 of a double periodic CRLH-SIW leaky wave antenna in accordance with embodiments of the invention are plotted in FIG. 6(c). The three distinct frequency regions are shown as the first right-handed region that ranges from $f_1$=5.7 GHz to $f_3$=7.3 GHz, the left-handed region that ranges from $f_3$=7.3 GHz to $f_5$=10.37 GHz, and the second right-handed region that ranges from $f_5$=10.37 GHz to $f_6$=13.87 GHz. In the three leaky wave regions, $|S_{11}|$<−10 dB.

The simulated broadband gain and the measured broadband gain of the double periodic CRLH-SIW leaky wave antenna in accordance with embodiments of the invention are plotted in FIG. 6(c) as plot 620. It can be seen that the gain>5 dBi in the left-handed region ranging from 7.8 to 10.37 GHz and the gain>8 dBi in the right-handed region ranging from 10.37 to 13.87 GHz. The gain in the left-handed region and the first right-handed region is lower than the gain in the second right-handed region due to the interactions of the smaller aperture at lower frequencies.

Figure 6D:
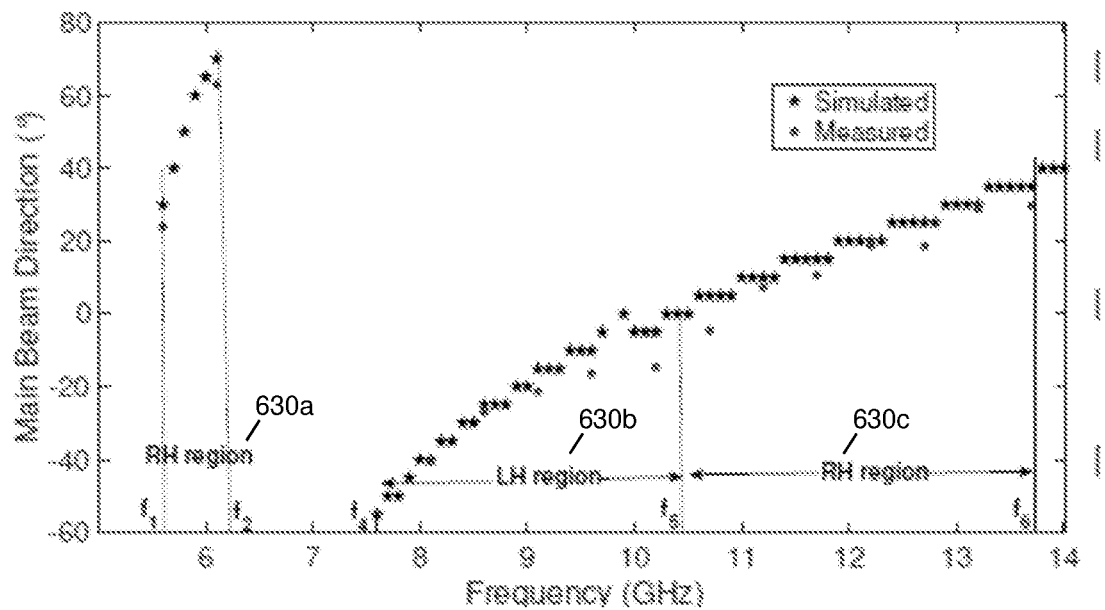
FIG. 6(d) illustrating the simulated and measured main beam direction of the double periodic CRLH-SIW leaky wave antenna in accordance with embodiments of the invention for a signal that is radiated with varying frequencies.

The simulated main beam direction and the measured main beam direction of a double periodic CRLH-SIW leaky wave antenna in accordance with embodiments of the invention are plotted in FIG. 6(d) for a radiated signal when the signal's frequencies are varied. In the first right-handed leaky wave region 630a, between the frequencies $f_1$ to $f_2$, the main beam scans in the forward direction and as can be seen, the scanning range varies between 30° and 65°. In the left-handed leaky wave region 630b, between the frequencies $f_4$ and $f_5$, the main beam scans in the backward direction and the scanning range varies between −55° and 0°. In the right-handed leaky wave region 630c, between the frequencies $f_5$ to $f_6$, the main beam scans in the forward direction and the scanning range varies between 0° and 40°. It can be seen from equations (3) and (4) below that $|\Delta\theta/\Delta f|$ LH is close to $|\Delta\theta/\Delta f|$ RH and hence, this shows that the double periodic CRLH-SIW leaky wave antenna has frequency-linear beam-scanning characteristics.

$$\left|\frac{\Delta\theta}{\Delta f}\right|LH = \frac{-55°}{2.7\, \text{GHz}} = -20.37\, (°/\text{GHz}) \quad \text{Equation (3)}$$

$$\left|\frac{\Delta\theta}{\Delta f}\right|RH = \frac{-40°}{3.5\, \text{GHz}} = -28.57\, (°/\text{GHz}) \quad \text{Equation (4)}$$

The double periodic CRLH-SIW leaky wave antenna described in this section may then be utilized in CW transceivers 101 and 102 of radar sensor 100 in accordance with embodiments of the invention.

A Six-Port Interferometer

The detailed working of an embodiment of six-port interferometer 120 is described in greater detail in this section. A six-port interferometer or a six-port receiver is able to discriminate the phase difference between two signals directly. This is due to the continuous wave interferometry property of the six-port receiver in the microwave domain, as the six-port interferometer is configured to perform multiple phase shifted superposition of received signals at microwave frequencies.

Figure 7A:
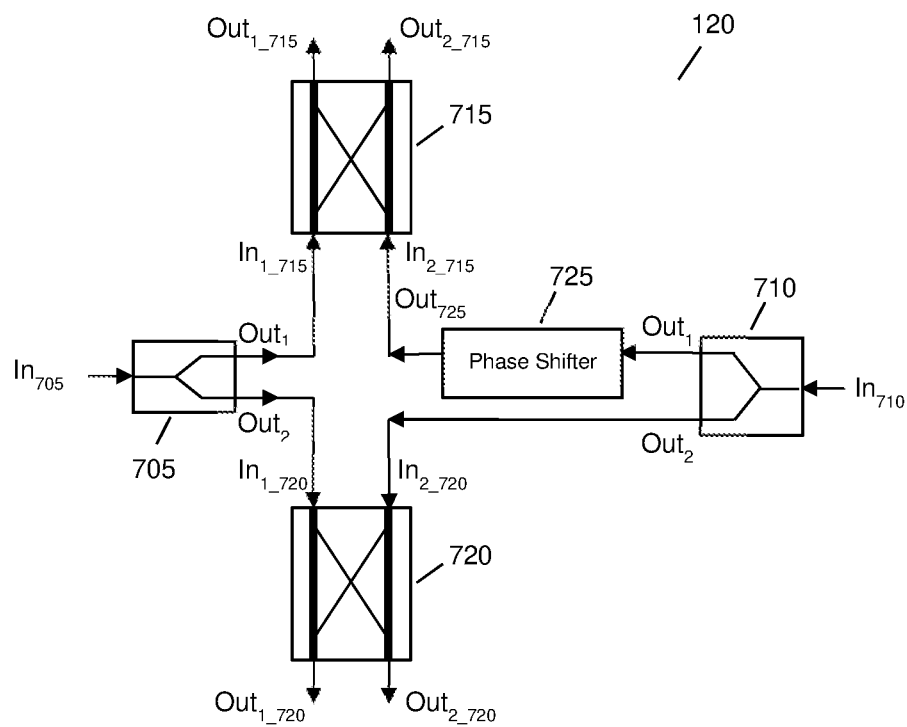
FIG. 7(a) illustrating a block diagram of a six-port interferometer in accordance with embodiments of the invention.

FIG. 7(a) illustrates a six-port interferometer 120 comprising two directional couplers 715, 720, two power dividers 705, 710, and 90 degree phase shifter 725. Power divider 705 has an input port that may be configured to receive an input signal, $In_{705}$. In embodiments of the invention, the input port of power divider 705 may be coupled to the output port of divider circuit 110. Directional coupler 715 has an input port that is coupled to an output port Out$_1$ of power divider 705 and directional coupler 720 has an input port that is coupled to another output port Out$_2$ of power divider 705. Power divider 710 has an input port that may be configured to receive an input signal, In$_{710}$, and has one output port Out$_1$ coupled to an input port of wideband phase shifter 725 and another output port Out$_2$ coupled to another input port of directional coupler 720 to provide signal In$_{2\_720}$. An output port Out$_{725}$ of wideband phase shifter 725 is then in turn coupled to another input port of directional coupler 715 to provide signal In$_{2\_715}$. It should be noted that all the components in six-port interferometer 120 are internally matched to one another.

With reference to FIG. 7(a), it can be seen that when two signals, In$_{705}$ and In$_{710}$ are provided to six-port interferometer 120, four different output signals will be generated, i.e. Out$_{1\_715}$, Out$_{2\_715}$, Out$_{1\_720}$, and Out$_{2\_720}$.

$$\text{Out}_{1\_715} = 0.5(\text{In}_{705} + j^*\text{In}_{710}) \quad \text{Equation (5)}$$

$$\text{Out}_{2\_715} = 0.5(\text{In}_{710} + j^*\text{In}_{705}) \quad \text{Equation (6)}$$

$$\text{Out}_{1\_720} = 0.5(\text{In}_{705} - \text{In}_{710}) \quad \text{Equation (7)}$$

$$\text{Out}_{2\_720} = 0.5(\text{In}_{705} + \text{In}_{710}) \quad \text{Equation (8)}$$

These four different output signals may subsequently be down converted to baseband signals by diode-based power detectors (not shown) delivering voltages P$_{1\_715}$, P$_{2\_715}$, P$_{1\_720}$, and P2$_{720}$ which are directly related to the relative phase shift between the input signals In$_{705}$ and In$_{710}$. Due to the quadrature relationship of the baseband outputs, a complex number will be formed in a differential form and the argument of this number will be equivalent to the phase shift $\Delta\varphi$ between input signals In$_{705}$ and In$_{710}$. Once the phase difference $\Delta\varphi$ has been obtained, the relative distance displacement, L can then be calculated relative to the microwave signal wavelength, $\lambda$. The phase difference, $\Delta\varphi$ and the relative distance displacement L may then be obtained from the following equations:

$$\Delta\varphi = \tan^{-1}\left(\frac{P_{1\_715} - P_{2\_715}}{P_{1\_720} - P_{2\_720}}\right) \quad \text{Equation (9)}$$

$$L = \frac{\Delta\varphi \cdot \lambda}{2\pi} \quad \text{Equation (10)}$$

Hence, once the output signals from six-port interferometer 120 have been obtained and down converted to baseband power signals, computing module 125 may then compute the phase difference, $\Delta\varphi$ between the reference signal and the backscattered signal (i.e. In$_{705}$ and In$_{710}$) and the relative displacement L between object 130 and CW radar transceiver 101/102 using equations (5)-(10).

Graded Index (GRIN) Directional Coupler

In accordance with embodiments of the invention, directional couplers 715 and 720 in FIG. 7(a) may comprise graded index (GRIN) based substrate integrated waveguide (SIW) directional couplers. The GRIN is introduced in a region by inserting air holes with varying radii in the coupling region of the SIW directional coupler. The operating bandwidth of the directional coupler may then be determined by the cut-off frequency of the TE$_{20}$ mode and the cut-off frequency of the TE$_{30}$ mode in the coupling region of the directional coupler. The cut-off frequency of the TE$_{20}$ mode and the cut-off frequency of the TE$_{30}$ mode in the coupling region of the directional coupler are in turn then determined by the width of the coupling region and the effective permittivity in coupling region. As a result, the operating bandwidth of the directional coupler increases when the effective permittivity in the coupling region decreases.

Figure 7B:
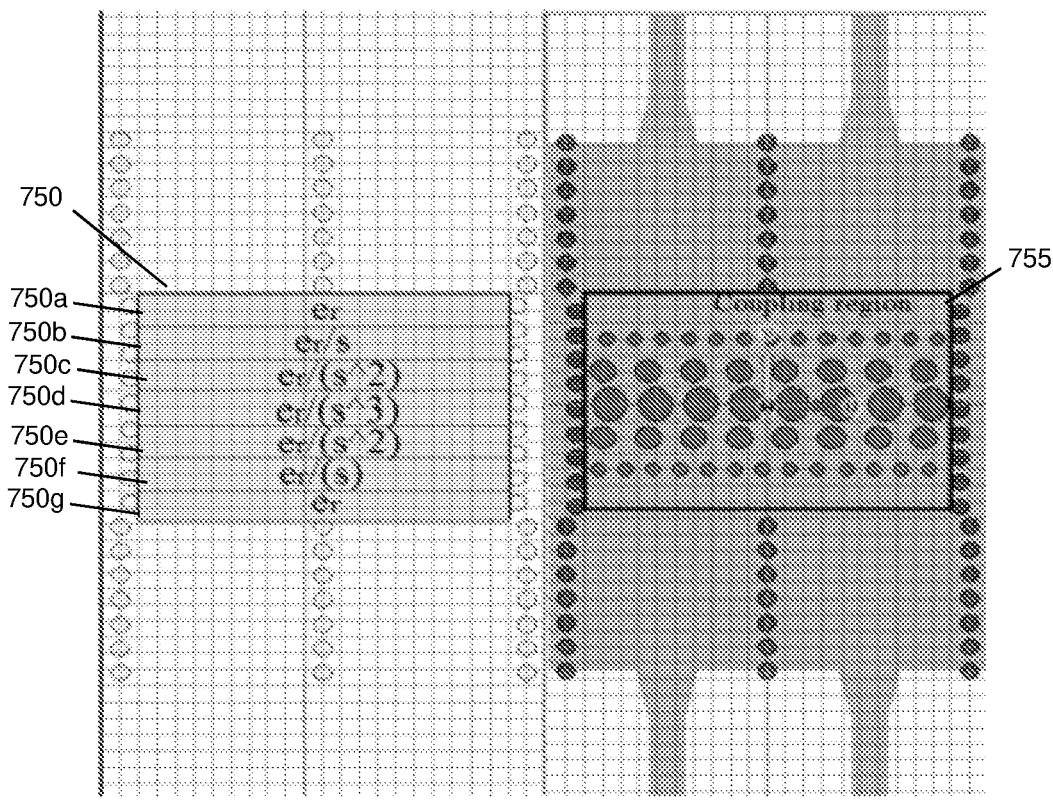
FIG. 7(b) illustrating a block diagram of directional coupler that has been designed with a Gradient Index (GRIN) substrate in accordance with embodiments of the invention.

As illustrated in FIG. 7(b), a gradient index region 750 may be achieved in the coupling region of a directional coupler by subdividing the coupling region 755 into sub-regions 750(a)-(g) of varying permittivity. Each sub-region may then be physically realized using a rectangular strip having a series of air-holes of particular radii, r, and a particular separation gap, g between adjacent air-holes as illustrated in coupling region 755. The refractive index and the intrinsic impedance of the substrate of finite thickness can then be determined from the S-parameters that may be obtained by a full wave extraction method. The values of r and g for each sub-region are determined by tuning the structure until the desired effective permittivity is obtained as shown in Table 2 below. The sub-regions 750(a)-(g) containing the series of air-holes may then be subsequently identified as the GRIN substrate of the directional coupler.

TABLE 2

| Permittivity | r (mm) | g (mm) |
|---|---|---|
| 3.55 | — | — |
| 2.96 | 0.4 | 1.5 |
| 2.47 | 0.72 | 2.5 |
| 2.05 | 0.95 | 2.5 |
| 2.47 | 0.72 | 2.5 |
| 2.96 | 0.4 | 1.6 |
| 3.55 | — | — |

Graded Index (GRIN) Rat Race Coupler

Based on the same concept as the GRIN region in the directional coupler, in accordance with embodiments of the invention, rat race coupler 210 in FIG. 2 may comprise graded index (GRIN) based substrate integrated waveguide (SIW) regions. The GRIN is introduced in the region by inserting air holes with varying radii in the coupling region of the rat race coupler. The radius of the air holes may be computed using Gaussian Process Regression (GPR) techniques and the detailed description of the GPR technique is omitted for brevity in this description as it is known to one skilled in the art.

Compact Wideband Phase Shifter with Square Complementary Omega (SCO) Array Loaded Substrate Integrated Waveguide (SIW)

Figure 7C:
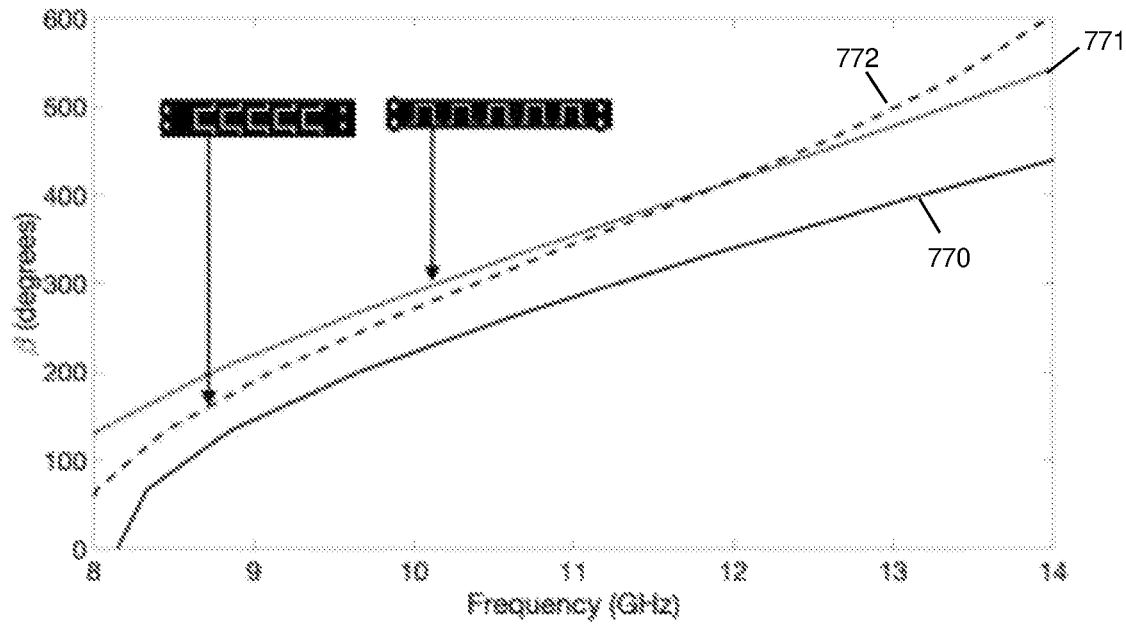
FIG. 7(c) illustrating a dispersion diagram analysis for a Split Complementary Omega (SCO) array loaded Substrate Intergrated Waveguide (SIW) with stems along the x-axis and a SCO array loaded SIW with stems along the z-axis in accordance with embodiments of the invention.
Figure 7D:
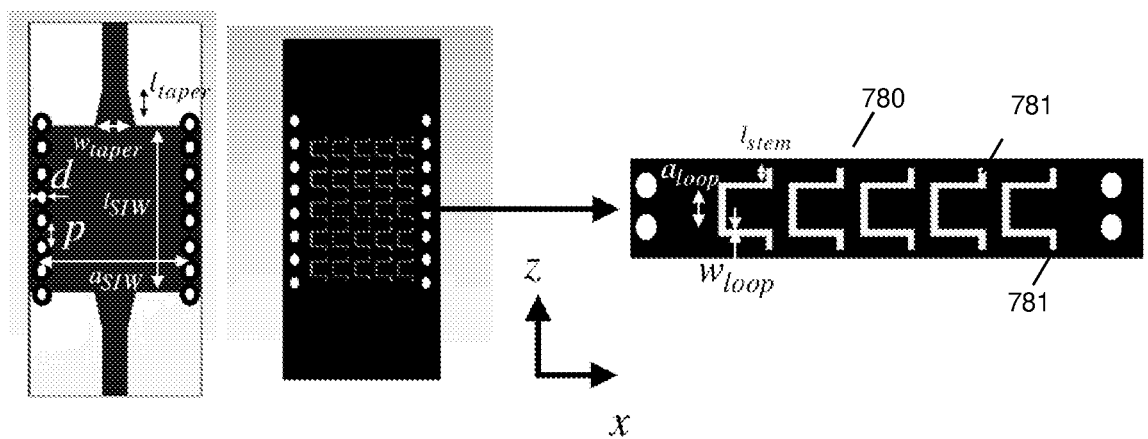
FIG. 7(d) illustrating a fabricated wideband phase shifter in accordance with embodiments of the invention.

In embodiments of the invention, phase shifter 725 may comprise a wideband phase shifter that include square complementary omega (SCO) structures that are etched in the ground plane of the substrate integrated waveguide (SIW) of the phase shifter. The dimensions of the individual SCOs may be determined by dispersion diagrams that are plotted for the respective SCOs and are selected based on the amount of phase shift that is required. An exemplary dispersion diagram is plotted in FIG. 7(c) for a simple SIW line, a SCO array loaded SIW with stems along a z-axis and a SCO array loaded SIW with stems along a x-axis. In particular, plot 770 illustrates a dispersion diagram for a simple SIW line, plot 771 illustrates a SCO array loaded SIW with stems along a z-axis and plot 772 illustrates a SCO array loaded SIW with stems along an x-axis.

A SCO array loaded SIW phase shifter is then fabricated based on plots 770-772, and the resulting phase shifter is illustrated in FIG. 7(*d*). In particular, a 45° phase shifter is designed by repeating five unit cells of SCO array 780 loaded SIW. The stems 781 of SCO array 780 point along the z-direction thus leading to a constant phase shift over a large frequency range (as compared to an SCO array loaded SIW with stems along an x-axis) and the design is carried out using a Rogers 4003C substrate (h=0.8128 mm, tan δ=0.0027, ∈$_r$=3.55). The phase shifter measures 0.83λ$_g$ at 10 GHz while $l_{taper}$=4 mm, $w_{taper}$=2.95 mm, d=0.5 mm, p=1.5 mm, $a_{SIW}$=11 mm, $l_{SIW}$=12.5 mm, $a_{loop}$=1.4 mm, $w_{loop}$=0.2 mm and $l_{stem}$=0.55 mm. When tested, the phase shifter was able to achieve a constant phase shift of 45° over a wide frequency range extending from 8 to 14 GHz (55%) with the return loss greater than 10 dB, insertion loss less than 1 dB and an accuracy of ±5°.

Figure 8A:
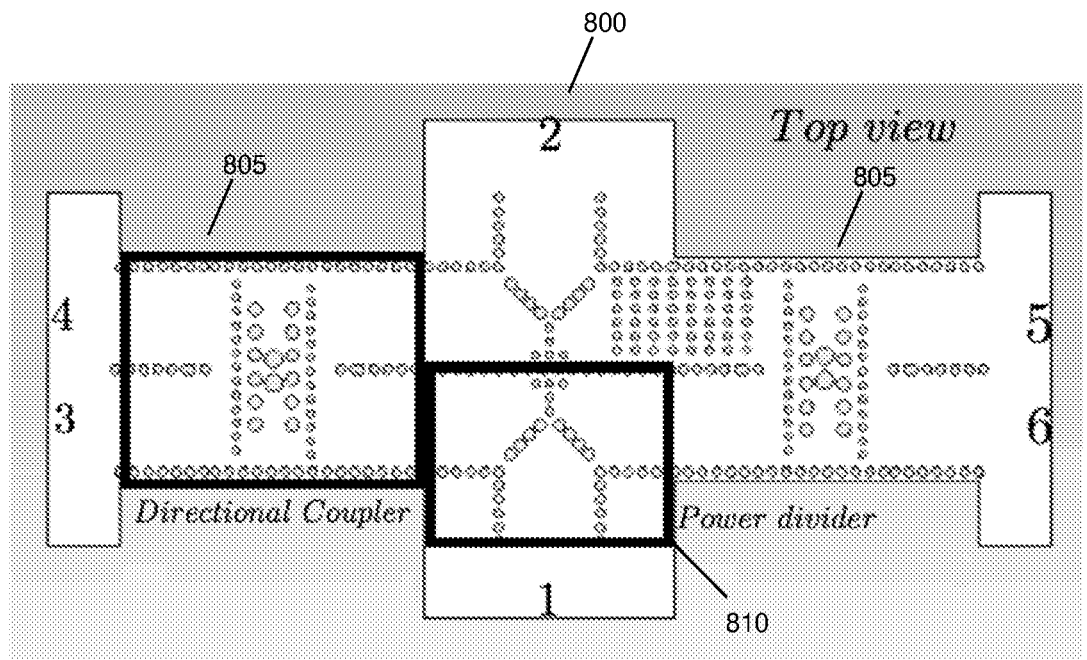
FIG. 8(a) illustrating a top view of the six-port interferometer illustrated in FIG. 7(a) in accordance with embodiments of the invention.
Figure 8B:
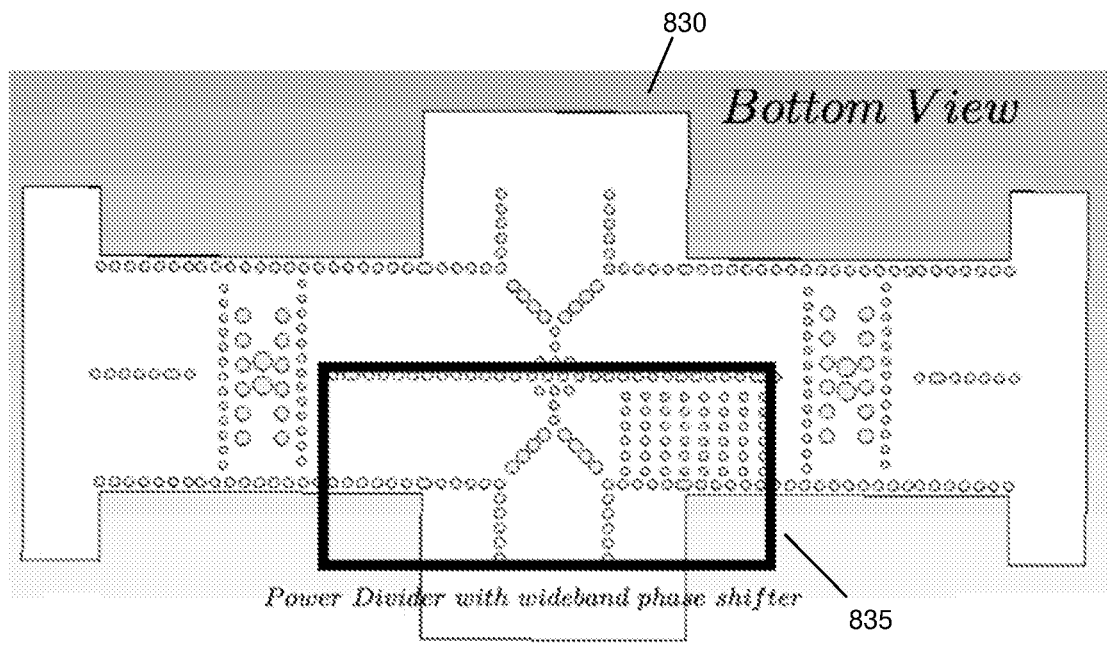
FIG. 8(b) illustrating a bottom view of the six-port interferometer illustrated in FIG. 7(a) in accordance with embodiments of the invention.
Figure 8C:
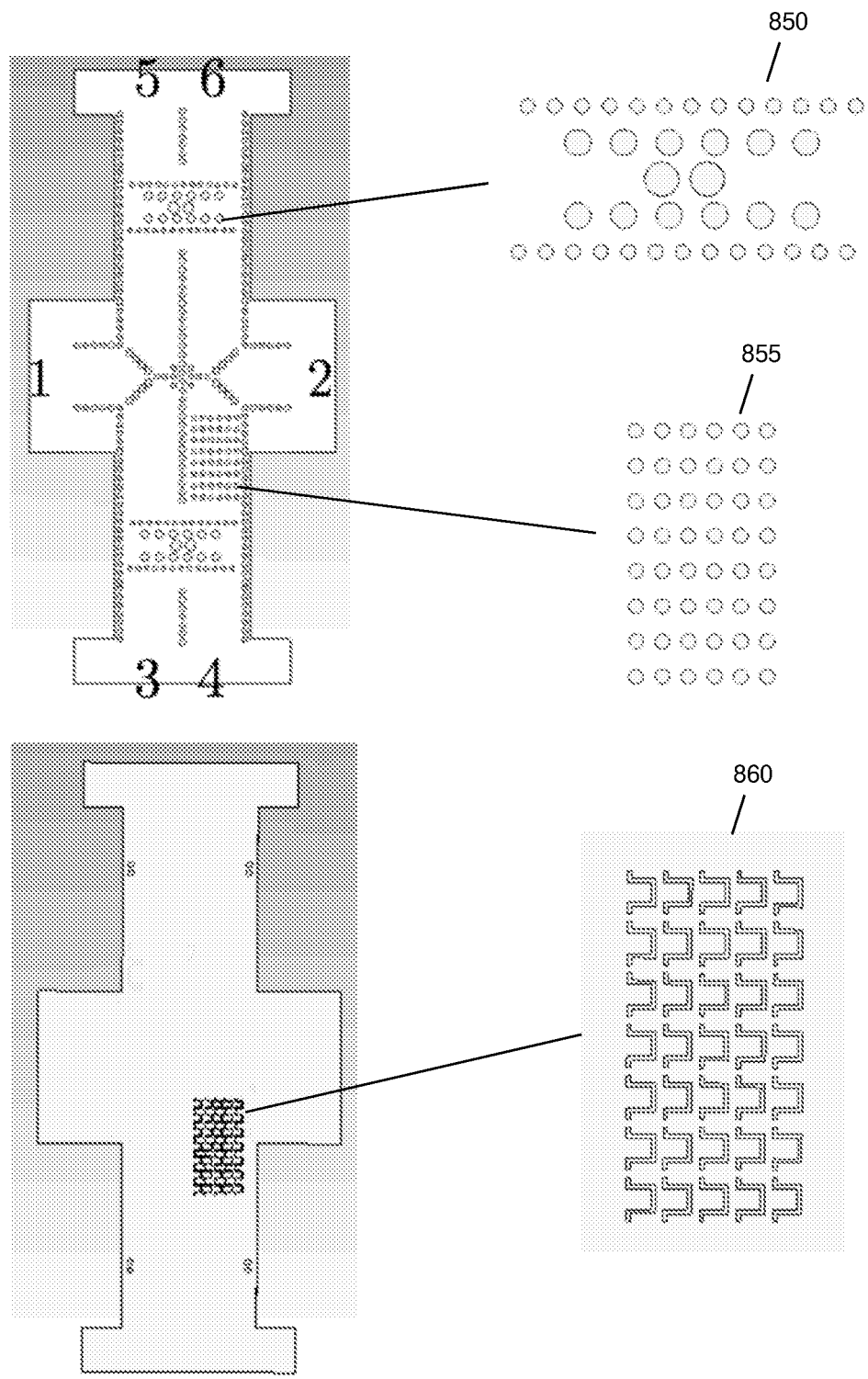
FIG. 8(c) illustrating a magnified view of the six-port interferometer illustrated in FIG. 7(a) in accordance with embodiments of the invention.
Figure 9A:
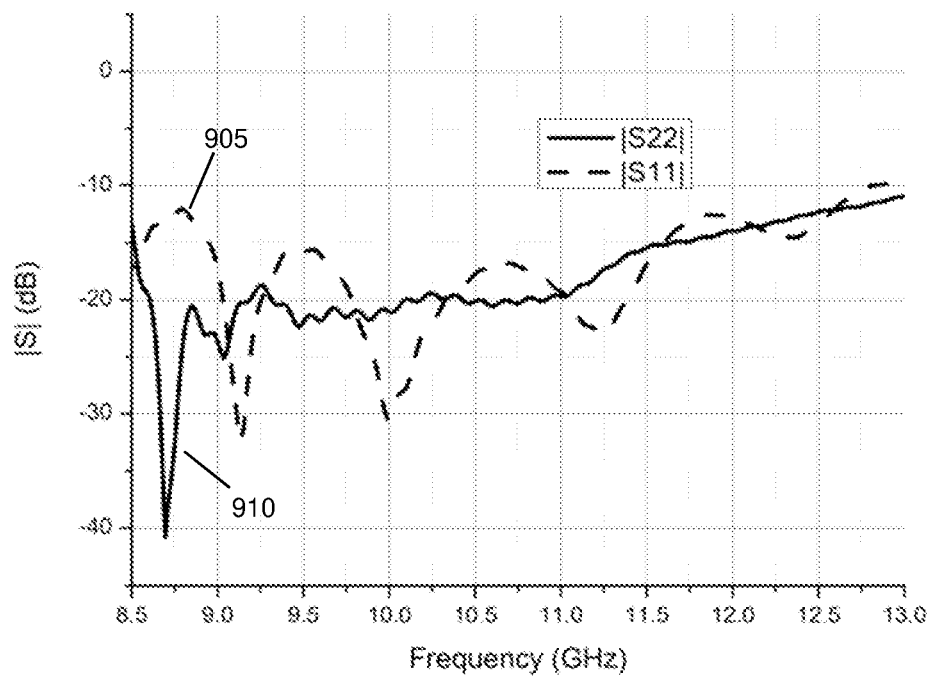
FIG. 9(a) illustrating S-parameters $S_{11}$ and $S_{22}$ of the six-port interferometer illustrated in FIG. 7(a) over varying frequencies in accordance with embodiments of the invention.
Figure 9B:
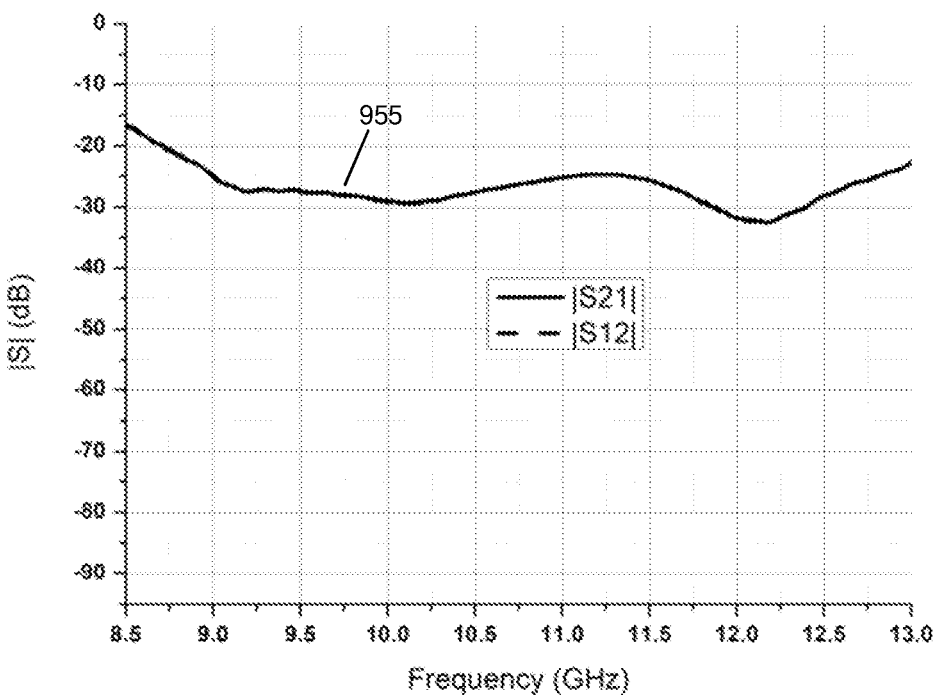
FIG. 9(b) illustrating S-parameters $S_{21}$ and $S_{12}$ of the six-port interferometer illustrated in FIG. 7(a) over varying frequencies in accordance with embodiments of the invention.

A top view of a fabricated six-port interferometer 120 in accordance with embodiments of the invention is illustrated in FIG. 8(*a*). Top view of fabricated six-port interferometer 800 illustrates two fabricated directional couplers 805 which were designed based on the graded index (GRIN) based substrate integrated waveguide (51 W) directional coupler described above and fabricated power divider 810. The design of fabricated power divider 810 was omitted for brevity as the design of such a circuit is known to a person skilled in the art. A bottom view of the fabricated six-port interferometer 120 in accordance with embodiments of the invention is illustrated in FIG. 8(*b*). Bottom view of fabricated six-port interferometer 830 illustrates a fabricated wideband phase shifter 835 having square complementary omega (SCO) structures as described in the previous section whereby the input of the phase shifter is coupled to the output of the power divider (as shown in FIG. 7(*a*)). For completeness, a magnified view of various components of the fabricated six-port interferometer is illustrated in FIG. 8(*c*). In particular, FIG. 8(*c*) shows a magnified view of the GRIN region 850 of the two directional couplers, the air holes 855 and the SCO structures 860 of the phase shifter. It should be noted that air-holes 855 produce a phase-advance of 45 degrees while SCO structures 860 produce a phase-lag of 45 degrees. Hence, when air-holes 855 and SCO structures 860 are combined, this produces a total phase shift of 90 degrees.

Figure 10A:
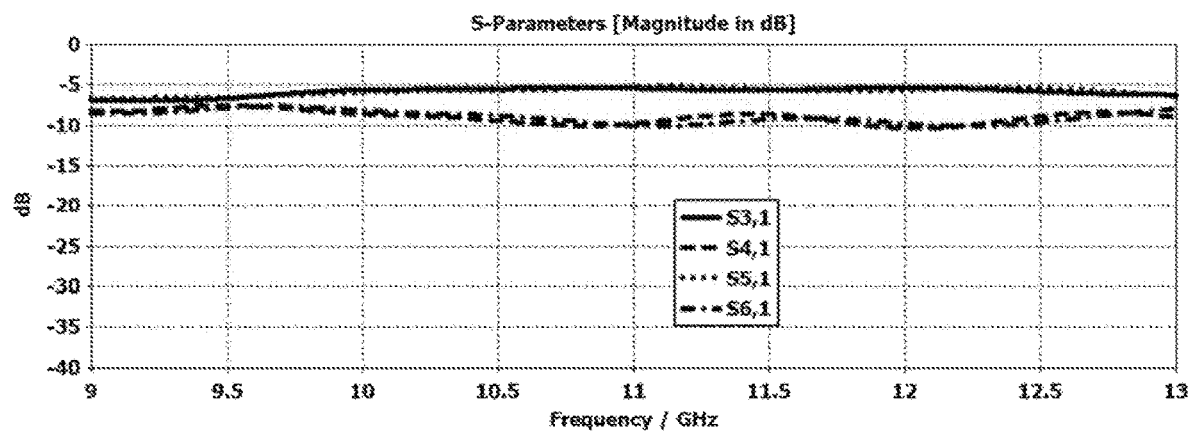
FIG. 10(a) illustrating the magnitudes of the S-parameters $S_{31}$, $S_{41}$, $S_{51}$, and $S_{61}$ of the six-port interferometer illustrated in FIG. 7(a) over varying frequencies in accordance with embodiments of the invention.
Figure 10B:
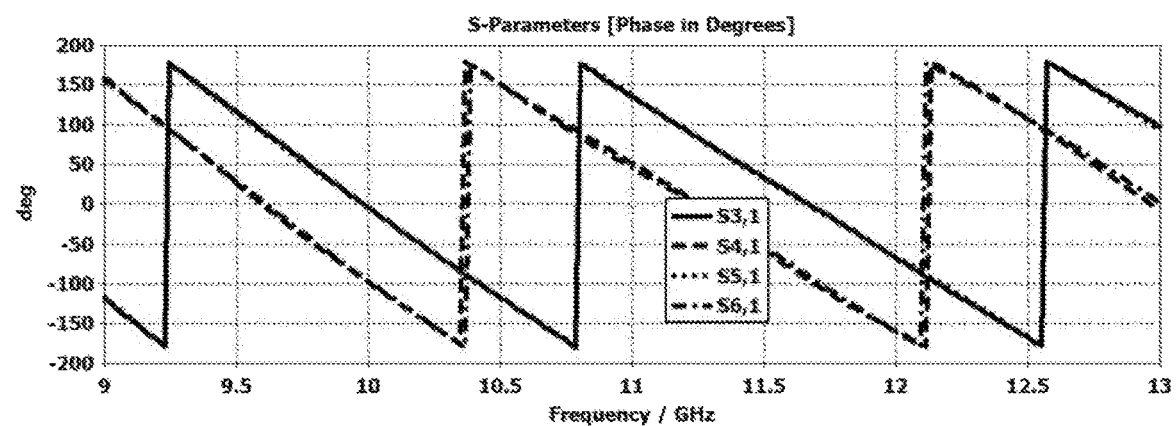
FIG. 10(b) illustrating the phases of the S-parameters $S_{31}$, $S_{41}$, $S_{51}$, and $S_{61}$ of the six-port interferometer illustrated in FIG. 7(a) over varying frequencies in accordance with embodiments of the invention.
Figure 11A:
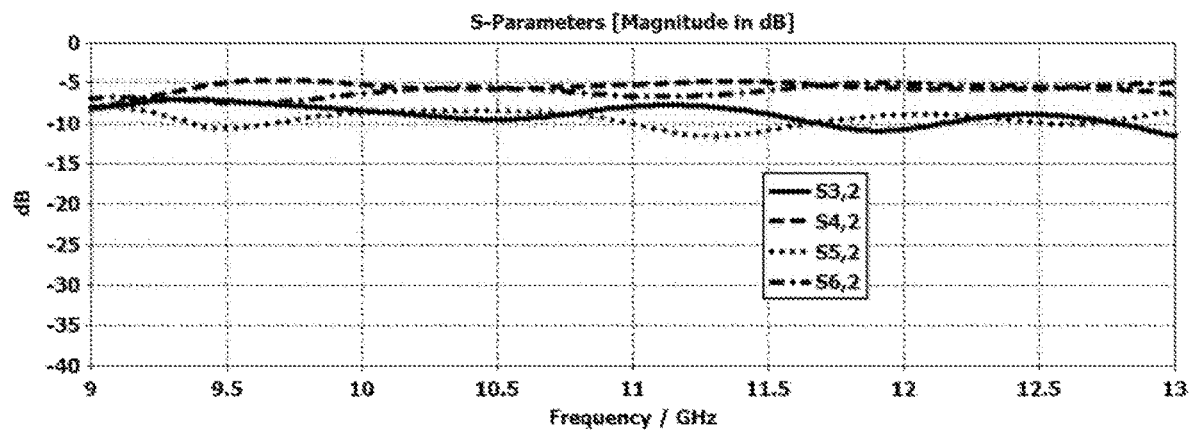
FIG. 11(a) illustrating the magnitudes of the S-parameters $S_{32}$, $S_{42}$, $S_{52}$, and $S_{62}$ of the six-port interferometer illustrated in FIG. 7(a) over varying frequencies in accordance with embodiments of the invention.
Figure 11B:
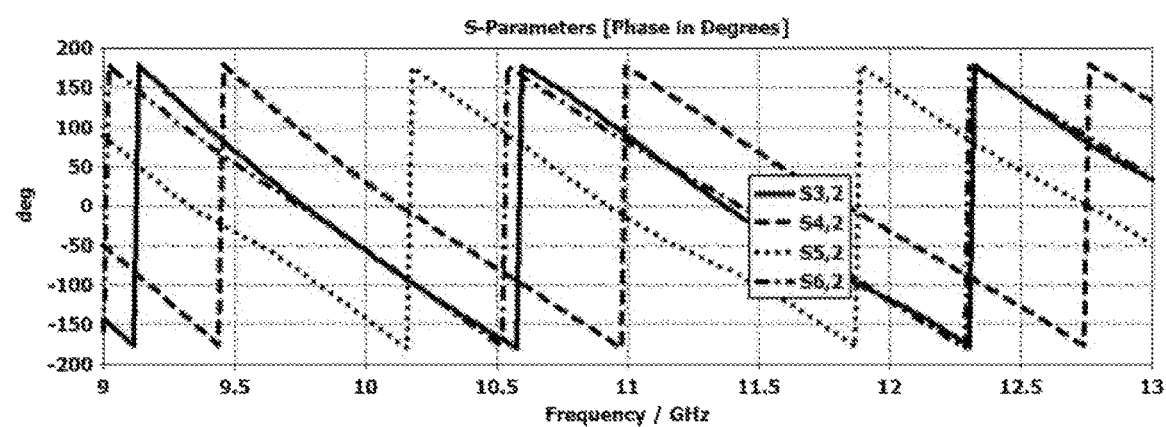
FIG. 11(b) illustrating the phases of the S-parameters $S_{32}$, $S_{42}$, $S_{52}$, and $S_{62}$ of the six-port interferometer illustrated in FIG. 7(a) over varying frequencies in accordance with embodiments of the invention.
Figure 12:
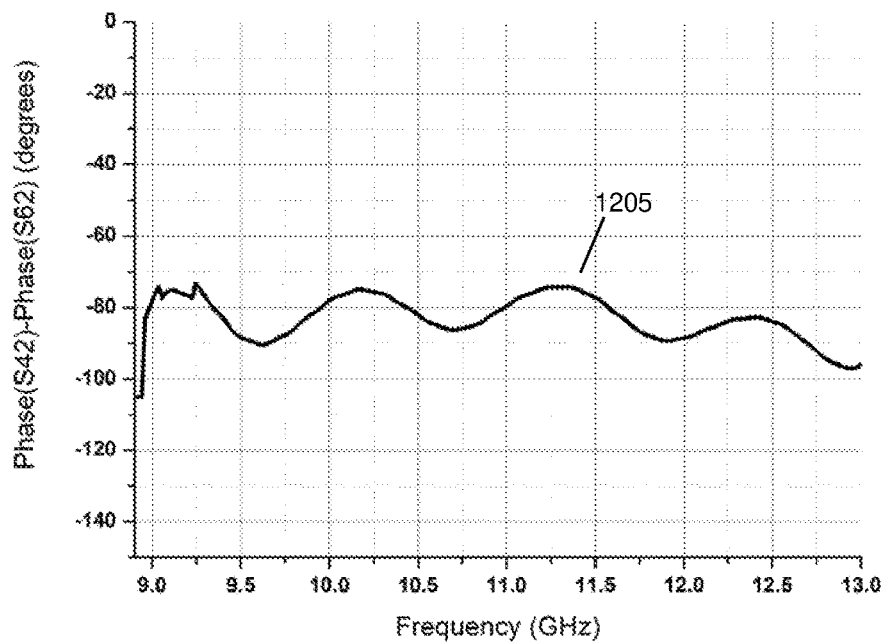
FIG. 12 illustrating the phase difference between the phases of S-parameters $S_{42}$ and $S_{62}$ of the six-port interferometer illustrated in FIG. 7(a) over varying frequencies in accordance with embodiments of the invention.

FIGS. 9-12 illustrate the S-parameter results obtained for the six-port interferometer illustrated in FIGS. 7(*a*) and 8. In particular, FIG. 9(*a*) illustrates S-parameter plots of $S_{11}$ 905 and $S_{22}$ 910 of the six-port interferometer while FIG. 9(*b*) illustrates the S-parameter plots $S_{21}$ 955 and $S_{12}$ of the six-port interferometer. Plots 905, 910, and 955 illustrate the matching and isolation properties of the six-port interferometer. Plots $S_{11}$ 905 and $S_{22}$ 910 show how much power is reflected at the input ports while and plot $S_{21}$ 955 shows how much power is reaching the other input port from one input port. As $S_{12}$ and $S_{21}$ are equal, the two plots overlap and as such one of the plots cannot be clearly seen. FIG. 10(*a*) illustrates the magnitudes of the S-parameters $S_{31}$, $S_{41}$, $S_{51}$, and $S_{61}$ of the six-port interferometer, FIG. 10(*b*) illustrates the phases of the S-parameters $S_{31}$, $S_{41}$, $S_{51}$, and $S_{61}$ of the six-port interferometer, FIG. 11(*a*) illustrates the magnitudes of the S-parameters $S_{32}$, $S_{42}$, $S_{52}$, and $S_{62}$ of the six-port interferometer and FIG. 11(*b*) illustrates the phases of the S-parameters $S_{32}$, $S_{42}$, $S_{52}$, and $S_{62}$ of the six-port interferometer. A phase imbalance of ±8 degrees was obtained in the frequency range between 10 GHz and 13 GHz and a phase imbalance±15 degrees was obtained in the frequency range between 8.86 GHz and 13 GHz, and this is shown in FIGS. 11(*a*) and (*b*). FIG. 12 illustrates the phase difference between the phases of S-parameters $S_{42}$ and $S_{62}$ of the six-port interferometer over varying frequencies. It can also be seen from FIGS. 9-12 that the six-port interferometer illustrated in FIG. 8 has an extended bandwidth as compared to six-port interferometers known in the art.

As mentioned in the earlier sections, with reference to FIG. 1, in order to enhance the detectable range of radar sensor 100, when leaky wave antenna 115 of CW radar transceiver 101 radiates a first signal having a first resonance frequency along a specific direction, a corresponding leaky wave antenna 115 of CW radar transceiver 102 will also be configured to radiate a second signal having a second resonance frequency along the same specific direction. The phase difference between the radiated signals and the received backscattered signals for the first and second signals are then generated by computing modules 125 of CW radar transceivers 101 and 102 respectively using equations (5)-(10).

Figure 13:
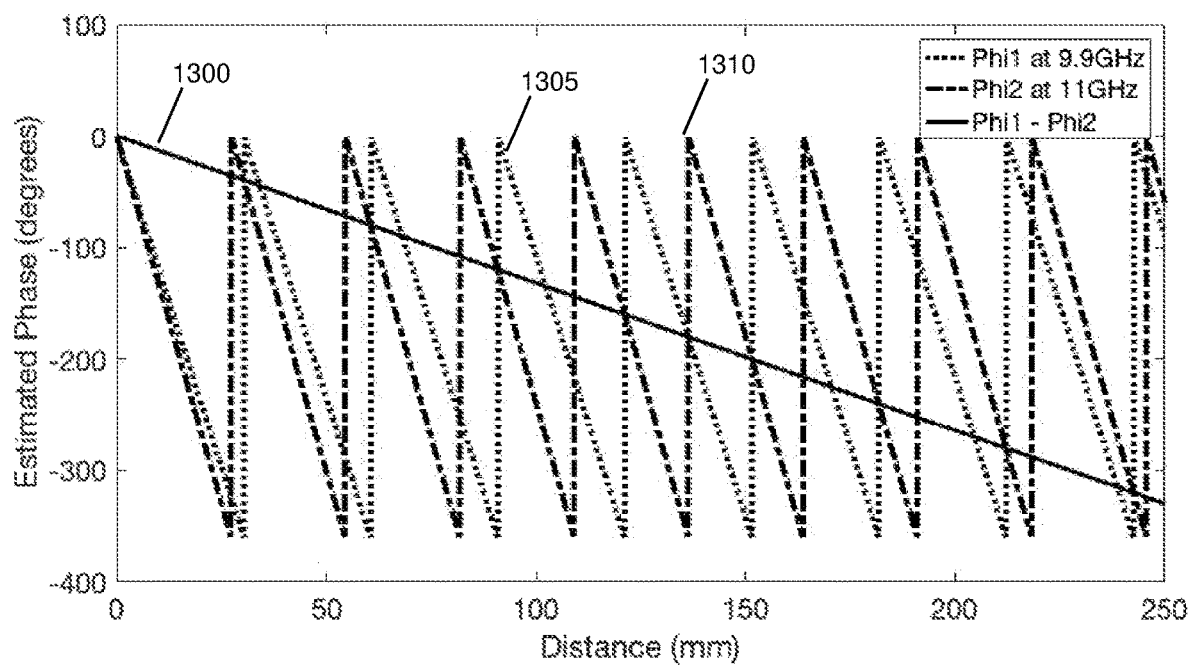
FIG. 13 illustrating simulated phase measurement results at frequencies 9.9 GHz and 11 GHz and the phase differences between these two frequencies in accordance with embodiments of the invention.

To illustrate this point, it is assumed that CW radar transceiver 101 is configured to transmit a signal at 9.9 GHz and this results in a main beam being radiated along a particular direction and that CW radar transceiver 102 is configured to transmit a signal at 11 GHz which results in a main beam also being radiated along the same particular direction as the main beam of CW radar transceiver 101. When equations (5)-(10) are used to plot the phase difference between the radiated signals and the received backscattered signals for CW radar transceivers 101 and 102 respectively, the phase difference from both transceivers may then be plotted in FIG. 13 as Phi1 1305 (for CW radar transceiver 101) and Phi2 1310 (for CW radar transceiver 102) over a distance between 0 and 250 mm. When the plot Phi2 1310 is subtracted from plot Phi1 1305, this produces plot 1300 which has a greatly increased unambiguous range along the main beam direction of both transceivers.

Figure 14:
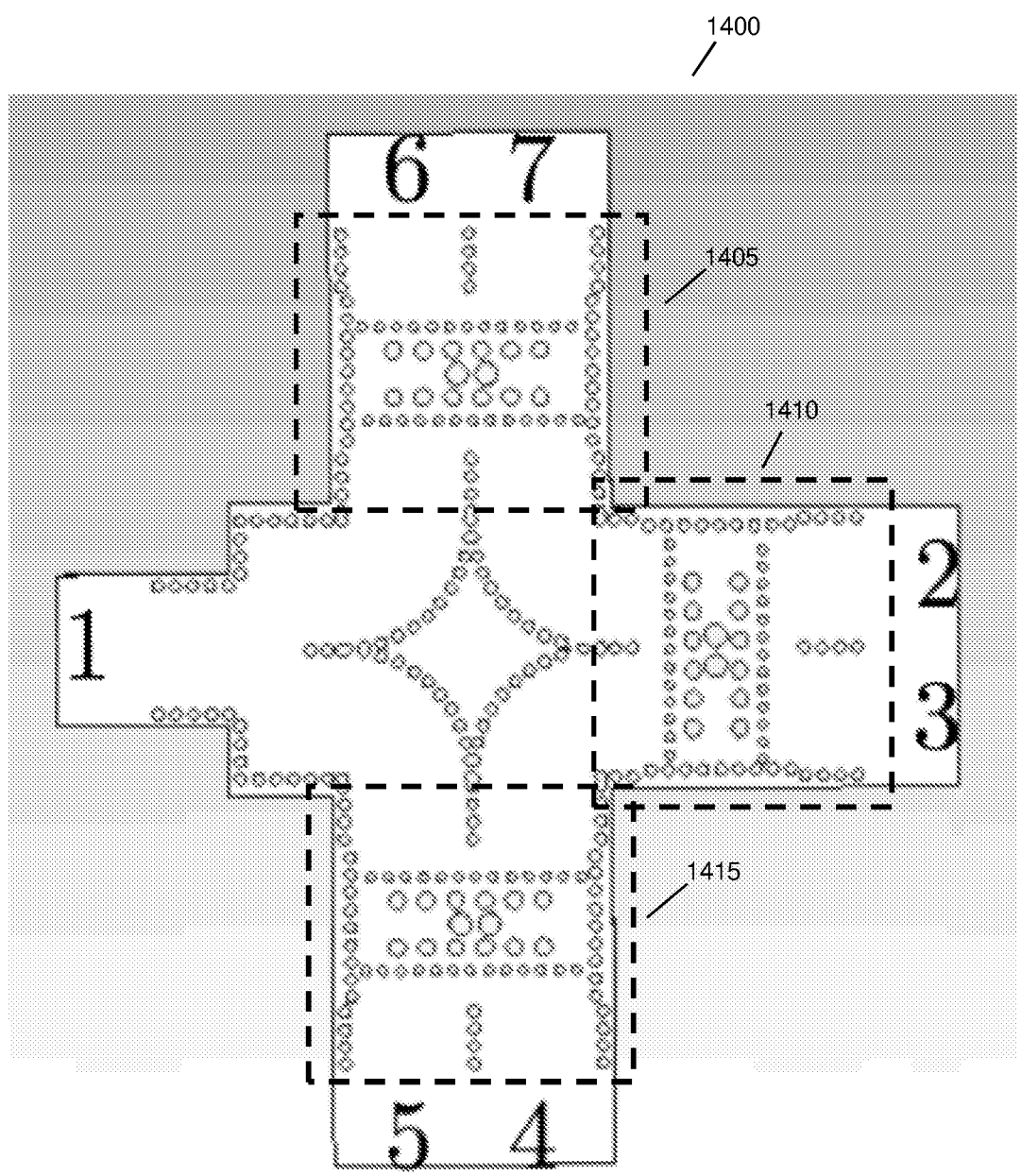
FIG. 14 illustrating a block diagram of a six-port interferometer in accordance with embodiments of the invention.

A top view of a fabricated six-port interferometer 120 in accordance with another embodiment of the invention is illustrated in FIG. 14. Top view of fabricated six-port interferometer 1400 illustrates three fabricated directional couplers 1405, 1410, 1415 which were designed based on the graded index (GRIN) based substrate integrated waveguide (SIW) directional coupler described above and a fabricated power divider. The directional coupler present at one of the inputs provides the required phase shift of 90 degrees between the two outputs feeding the other two directional couplers.

Figure 15A:
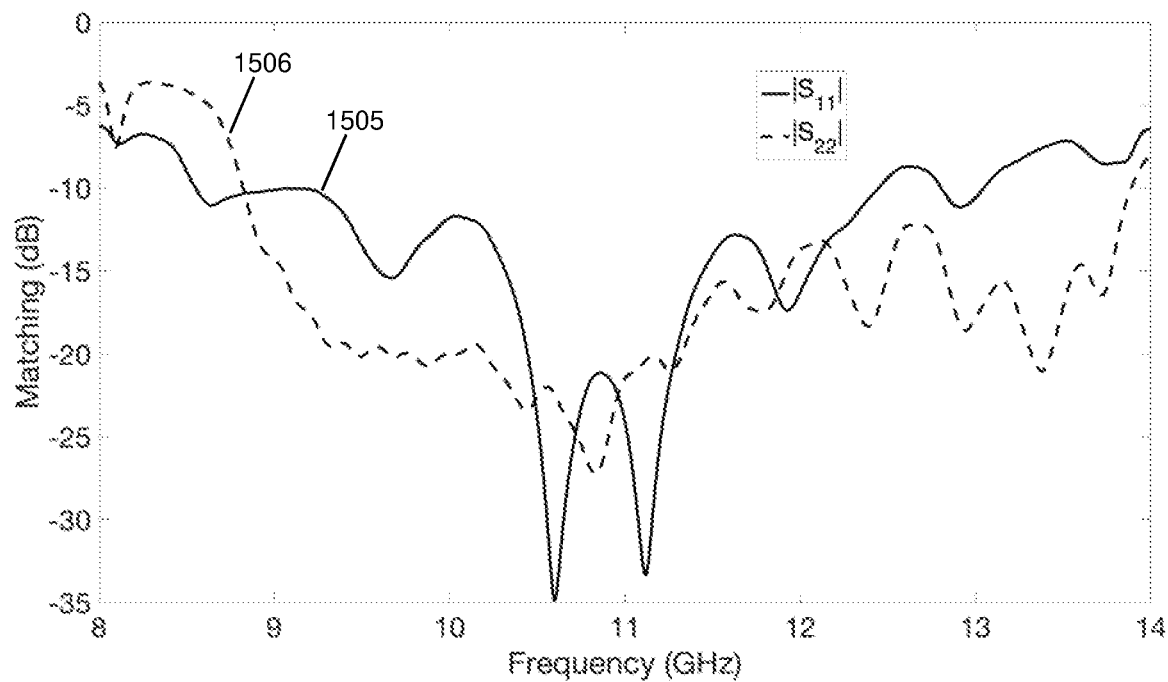
FIG. 15(a) illustrating S-parameters $S_{11}$ and $S_{22}$ of the six-port interferometer illustrated in FIG. 14 over varying frequencies in accordance with embodiments of the invention.
Figure 15B:
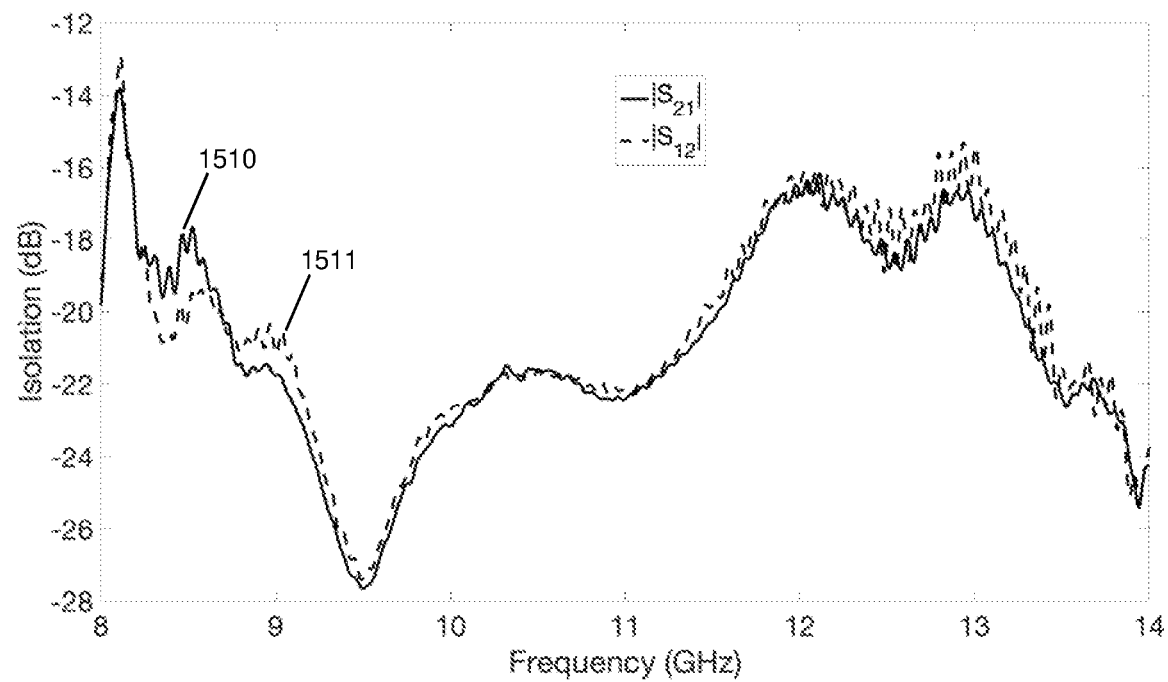
FIG. 15(b) illustrating S-parameters $S_{21}$ and $S_{12}$ of the six-port interferometer illustrated in FIG. 14 over varying frequencies in accordance with embodiments of the invention.
Figure 16A:
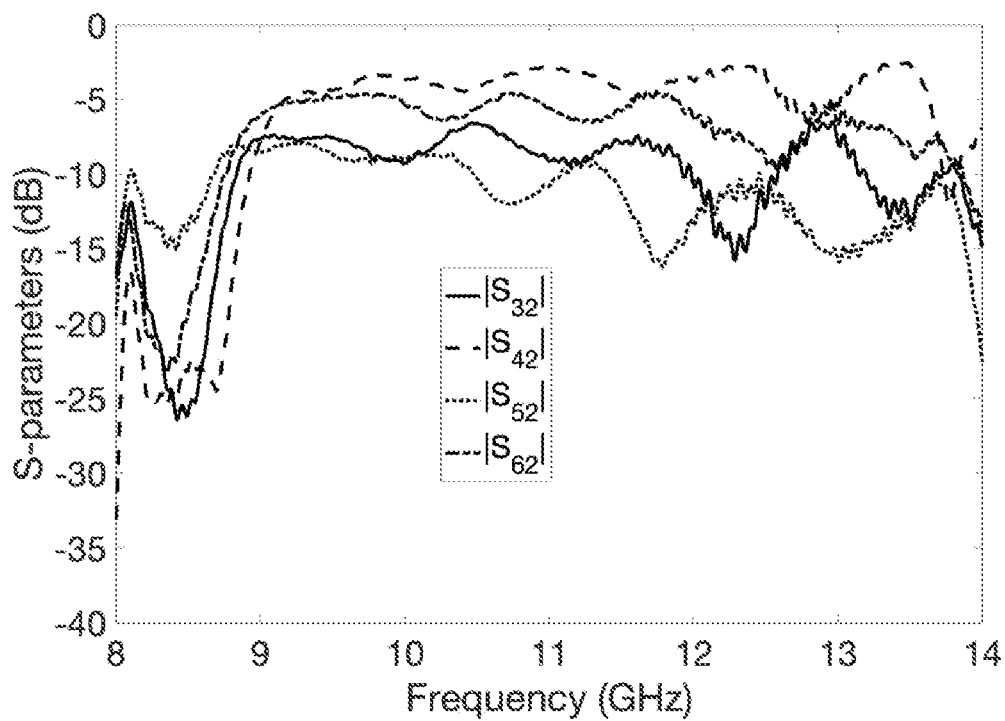
FIG. 16(a) illustrating the magnitudes of the S-parameters $S_{32}$, $S_{42}$, $S_{52}$, and $S_{62}$ of the six-port interferometer illustrated in FIG. 14 over varying frequencies in accordance with embodiments of the invention.
Figure 16B:
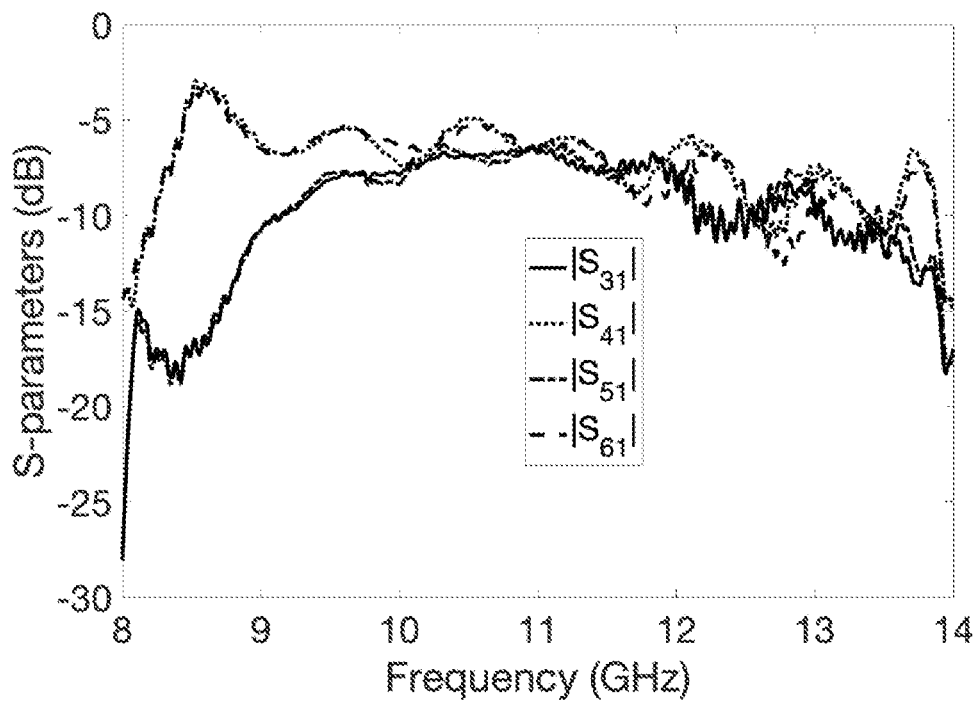
FIG. 16(b) illustrating the magnitudes of the S-parameters $S_{31}$, $S_{41}$, $S_{51}$, and $S_{61}$ of the six-port interferometer illustrated in FIG. 14 over varying frequencies in accordance with embodiments of the invention.
Figure 17A:
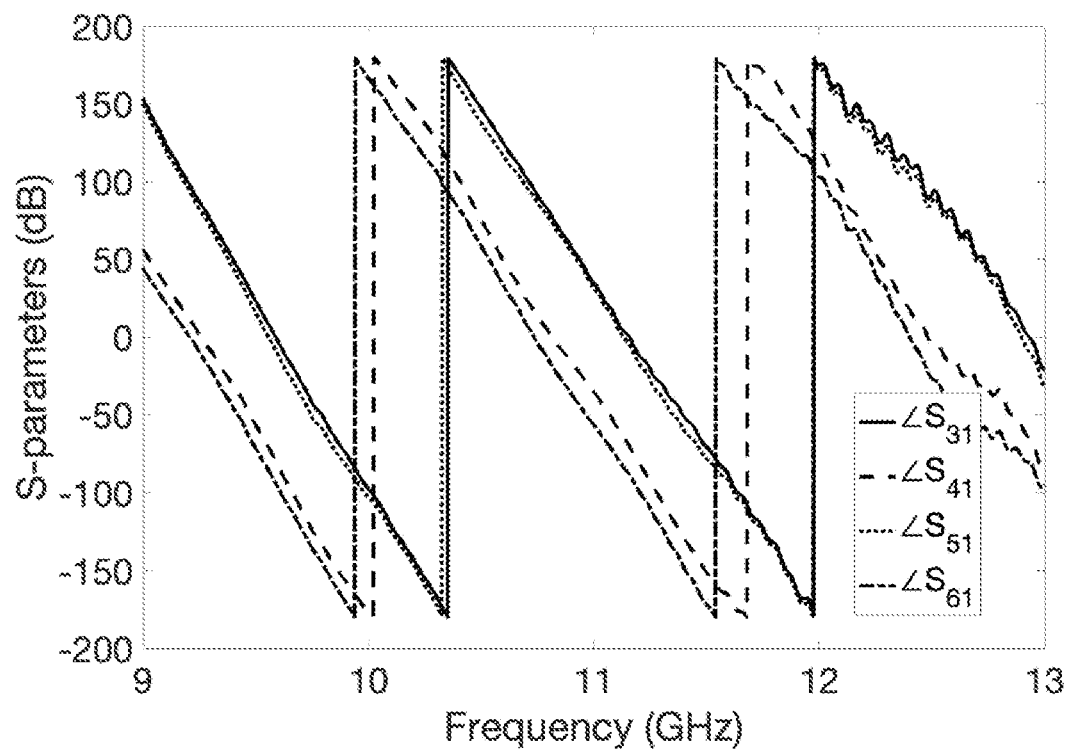
FIG. 17(a) illustrating the phases of the S-parameters $S_{31}$, $S_{41}$, $S_{51}$, and $S_{61}$ of the six-port interferometer illustrated in FIG. 14 over varying frequencies in accordance with embodiments of the invention.
Figure 17B:
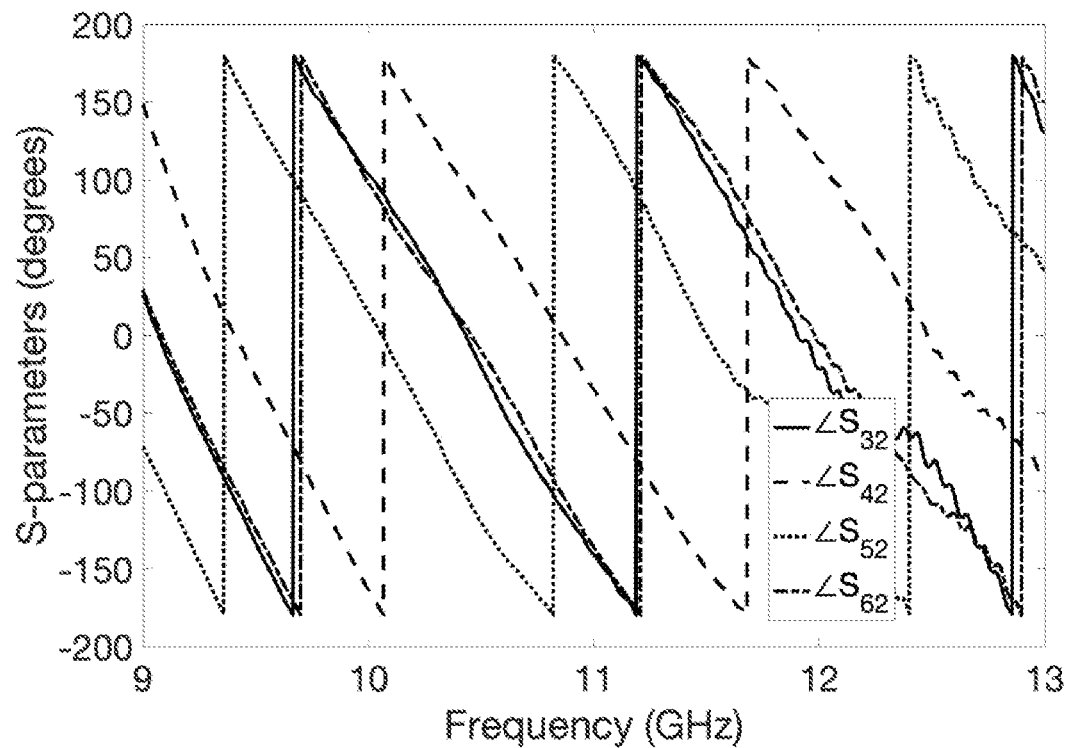
FIG. 17(b) illustrating the phases of the S-parameters $S_{32}$, $S_{42}$, $S_{52}$, and $S_{62}$ of the six-port interferometer illustrated in FIG. 14 over varying frequencies in accordance with embodiments of the invention.

FIGS. 15-17 illustrate the S-parameter results obtained for the six-port interferometer illustrated in FIG. 14. In particular, FIG. 15(*a*) illustrates S-parameter plots of $S_{11}$ 1505 and $S_{22}$ 1506 of the six-port interferometer while FIG. 15(*b*) illustrates the S-parameters $S_{21}$ 1510 and $S_{12}$ 1511 of the six-port interferometer. Plots 1506, 1505, 1510 and 1511 illustrate the matching and isolation properties of the subject six-port interferometer. Plots 1505 and 1506 show how much power is reflected at the input ports while plots 1510 and 1511 shows how much power is reaching the other input port from one input port. FIG. 16(*a*) illustrates the magnitudes of the S-parameters $S_{32}$, $S_{42}$, $S_{52}$, and $S_{62}$ of the six-port interferometer, FIG. 16(*b*) illustrates the phases of the S-parameters $S_{31}$, $S_{41}$, $S_{51}$, and $S_{61}$ of the six-port interferometer, FIG. 17(*a*) illustrates the phases of the S-parameters $S_{31}$, $S_{41}$, $S_{51}$, and $S_{61}$ of the six-port interferometer and FIG. 17(*b*) illustrates the phases of the S-parameters $S_{32}$, $S_{42}$, $S_{52}$, and $S_{62}$ of the six-port interferometer.

In order to evaluate the usefulness of radar sensor 100 for gesture recognition, 25 repetitions of a single gesture were recorded and duplicated 4 times by adding additive white Gaussian noise, making it 125 times for each gesture class. Hence, 500 sets of data may be obtained from all the four gestures. Machine learning algorithms were run in WEKA as well as Python. Based on this approach, the supervised learning classifier was trained using the 360 instances of gesture data obtained from a user and the trained model was validated using three different test sets of same size. The accuracy scores obtained for three test sets 1, 2 and 3 using Random Forest classifier were found to be 92.86%, 96.43% and 100% respectively. The accuracy scores obtained for test sets 1, 2 and 3 using support vector classifiers were found to be 89.29%, 95.71% and 97.14% respectively and the accuracy scores obtained for test sets 1, 2 and 3 using Linear support vector classifier were 99.29%, 93.57% and 96.43% respectively. The results achieved using the various classifiers are tabulated in Table 3 below.

TABLE 3

| | Accuracy % | | |
|---|---|---|---|
| | Random Forest | SVM | LinearSVM |
| Test Set 1 | 92.86 | 89.29 | 99.29 |
| Test Set 2 | 96.43 | 95.71 | 93.57 |
| Test Set 3 | 100 | 97.14 | 96.43 |

From the table above, it can be seen that a classification accuracy of 96% was achieved for the four static gestures when 500 data sets were used to train the classifier of each gesture. This shows the suitability of radar sensor 100 being used as the sensing mechanism for a dynamic gesture recognition system.

The above is a description of embodiments of a system and process in accordance with the present invention as set forth in the following claims. It is envisioned that others may and will design alternatives that fall within the scope of the following claims.

The invention claimed is:

1. A radar sensor comprising:
   a first and a second continuous wave (CW) radar transceiver, whereby each CW radar transceiver comprises:
   a voltage-controlled oscillator (VCO) configured to generate an output signal having a specific frequency;
   a divider circuit configured to divide the output signal from the VCO into a reference signal and a transmission signal;
   a double periodic composite right/left hand (CRLH) substrate integrated waveguide (SIW) leaky wave antenna configured to:
   receive the transmission signal from the divider circuit;
   transmit a backward or forward main beam, wherein a direction of the transmitted main beam is determined by the specific frequency of the received transmission signal, and when the main beam is reflected back to the antenna by an object adjacent the sensor, the antenna is further configured to generate a backscattered signal based on the reflected main beam;
   the divider circuit is further configured to divide the backscattered signal received from the antenna;
   a six-port interferometer configured to receive, by input ports of the six-port interferometer, the reference signal and the divided-backscattered signal from the divider circuit, whereby the six-port interferometer is configured to generate, based on the received reference and divided-backscattered signals, power signals at output ports of the six-port interferometer, the power signals being used for computing relative displacement L between the object and the radar sensor,
   whereby the double periodic CRLH SIW leaky wave antenna of the first CW radar transceiver is positioned adjacent the double periodic CRLH SIW leaky wave antenna of the second CW radar transceiver and,
   whereby the VCOs of the first and second CW radar transceivers are each tuned to generate output signals that each have a different specific frequency such that a direction of a main beam of the double periodic CRLH SIW leaky wave antenna of the first CW radar transceiver and a direction of a main beam of the double periodic CRLH SIW leaky wave antenna of the second CW radar transceiver are the same.

2. The radar sensor according to claim 1 wherein each six-port interferometer comprises:
   a first power divider having an input port coupled to the divider circuit to receive the reference signal;
   a first directional coupler having an input port coupled to an output port of the first power divider and having two output ports;
   a second directional coupler having an input port coupled to another output port of the first power divider and having two output ports;
   a second power divider having an input port coupled to the divider circuit to receive the divided-backscattered signal, and having an output port coupled to an input port of a wideband phase shifter, and having another output port coupled to another input port of the second directional coupler,
   wherein an output port of the wideband phase shifter is coupled to another input port of the first directional coupler.

3. The radar sensor according to claim 2 wherein gradient index (GRIN) substrates are provided at each coupling region of the first and second directional couplers.

4. The radar sensor according to claim 1, wherein each divider circuit comprises:
   a power divider configured to divide the output signal from the VCO equally into the reference signal and a divided output signal, and to provide the reference signal to one of the input ports of the six-port interferometer;
   a rat race coupler configured to receive the divided output signal at a sum port of the rat race coupler and to generate the transmission signal at a first port of the rat race coupler; and
   the rat race coupler is further configured to receive, from the antenna, the backscattered signal at the first port of the rat race coupler and to produce the backscattered signal at a difference port of the rat race coupler, whereby the difference port is coupled to another one of the input ports of the six-port interferometer.

5. The radar sensor according to claim 4, wherein a central coupling region of each rat race coupler comprises regions having varying values of permittivity.

6. The radar sensor according to claim 1 wherein the double periodic CRLH SIW leaky wave antenna of the first CW radar transceiver is positioned back-to-back with the double periodic CRLH SIW leaky wave antenna of the second CW radar transceiver.

7. The radar sensor according to claim 1 further comprising:
   a computing module coupled to the output ports of the six-port interferometers of the first and second CW radar transceivers, the computing module being configured to use the power signals from the first and second CW radar transceivers to compute the relative displacement L between the object and the radar sensor.

8. A method for determining relative displacement L between an object and a radar sensor using a first and a second continuous wave (CW) radar transceiver provided within the radar sensor, whereby the method comprises:
generating, by a voltage-controlled oscillator (VCO) provided within each CW radar transceiver, an output signal having a specific frequency;
dividing, by a divider circuit provided within each CW radar transceiver, the output signal from the VCO into a reference signal and a transmission signal;
receiving, by a double periodic composite right/left hand (CRLH) substrate integrated waveguide (SIW) leaky wave antenna provided within each CW radar transceiver, the transmission signal from the divider circuit and transmitting a backward or forward main beam, wherein a direction of the transmitted main beam is determined by the specific frequency of the received transmission signal, and when the main beam is reflected back to the antenna by an object adjacent the sensor, generating, by each CRLH SIW leaky wave antenna, a backscattered signal based on the reflected main beam;
dividing, by each divider circuit, the backscattered signal received from the antenna;
receiving, by input ports of a six-port interferometer provided within each CW radar transceiver, the reference signal and the divided-backscattered signal from the divider circuit, whereby the six-port interferometer generates power signals at output ports of the six-port interferometer based on the received reference and divided-backscattered signals, the power signals being used for computing relative displacement L between the object and the radar sensor,
whereby the double periodic CRLH SIW leaky wave antenna of the first CW radar transceiver is positioned adjacent the double periodic CRLH SIW leaky wave antenna of the second CW radar transceiver and,
whereby the VCOs of the first and second CW radar transceivers are each tuned to generate output signals that each have a different specific frequency such that the main beam of the double periodic CRLH SIW leaky wave antenna of the first CW radar transceiver and the main beam of the double periodic CRLH SIW leaky wave antenna of the second CW radar transceiver are pointing at a same direction.

9. The method according to claim 8 wherein each six-port interferometer comprises:
a first power divider having an input port coupled to the divider circuit to receive the reference signal;
a first directional coupler having an input port coupled to an output port of the first power divider and two output ports;
a second directional coupler having an input port coupled to the output port of the first power divider and two output ports;
a second power divider having an input port coupled to the divider circuit to receive the divided-backscattered signal, and having an output port that is coupled to an input port of a wideband phase shifter, and another output port that is coupled to another input port of the second directional coupler,
wherein an output port of the wideband phase shifter is coupled to another input port of the first directional coupler.

10. The method according to claim 9 wherein gradient index (GRIN) substrates are provided at each coupling region of the first and second directional couplers.

11. The method according to claim 8, wherein dividing by each divider circuit comprises:
dividing, by a power divider provided within each CW radar transceiver, the output signal from the VCO equally into the reference signal and a divided output signal, and providing the reference signal to one of the input ports of the six-port interferometer;
receiving, by a rat race coupler provided within each CW radar transceiver, the divided output signal at a sum port of the rat race coupler and generating the transmission signal at a first port of the rat race coupler; and
receiving from the antenna, by the rat race coupler, the backscattered signal at the first port of the rat race coupler and producing the backscattered signal at a difference port of the rat race coupler, whereby the difference port is coupled to another one of the input ports of the six-port interferometer.

12. The method according to claim 11, wherein a central coupling region of each rat race coupler comprises regions having varying values of permittivity.

13. The method according to claim 8 wherein the double periodic CRLH SIW leaky wave antenna of the first CW radar transceiver is positioned back-to-back with the double periodic CRLH SIW leaky wave antenna of the second CW radar transceiver.

14. The method according to claim 8 further comprising:
computing, by a computing module that is provided within each of the first and second CW radar transceivers and that is coupled to the output ports of the six-port interferometer provided within each of the first and second CW radar transceivers, the relative displacement L between the object and the radar sensor based on the power signals received from the six-port interferometers of the first and second CW radar transceivers.

* * * * *